(12) United States Patent
Qiang

(10) Patent No.: US 9,476,467 B2
(45) Date of Patent: Oct. 25, 2016

(54) DUAL-DIRECTIONS BRAKING METHOD OF DISC BRAKE, BRAKING MECHANISM AND BRAKING SYSTEM THEREOF

(76) Inventor: Haisheng Qiang, Beijing (CN)

(*) Notice: Subject to any disclaimer, the term of this patent is extended or adjusted under 35 U.S.C. 154(b) by 0 days.

(21) Appl. No.: 14/416,636

(22) PCT Filed: Jul. 24, 2012

(86) PCT No.: PCT/CN2012/079070
§ 371 (c)(1),
(2), (4) Date: Jan. 23, 2015

(87) PCT Pub. No.: WO2014/015473
PCT Pub. Date: Jan. 30, 2014

(65) Prior Publication Data
US 2015/0204398 A1  Jul. 23, 2015

(51) Int. Cl.
*F16D 55/00* (2006.01)
*F16D 55/40* (2006.01)
*F16D 65/18* (2006.01)
*B64C 25/42* (2006.01)

(52) U.S. Cl.
CPC ........... *F16D 55/40* (2013.01); *B64C 25/42* (2013.01); *F16D 65/186* (2013.01)

(58) Field of Classification Search
CPC ...... F16D 27/02; F16D 55/40; F16D 55/224; F16D 55/225; F16D 65/21; F16D 65/123; F16D 65/125; B60T 1/06; B60T 1/065; F03D 7/0224; F03D 7/0248; B64C 25/42; B64C 11/002
USPC ......... 188/71.1, 71.5, 1.7, 72.3, 72.4; 416/9, 416/153, 169 R
See application file for complete search history.

(56) References Cited

U.S. PATENT DOCUMENTS

| | | | | |
|---|---|---|---|---|
| 2001/0038240 A1* | 11/2001 | Yoshida | ................... | B60T 7/042 303/28 |
| 2004/0050631 A1* | 3/2004 | Booher | ................... | B60T 1/065 188/71.1 |
| 2007/0246311 A1* | 10/2007 | Schneider | ............... | F16D 55/22 188/72.7 |
| 2011/0014048 A1* | 1/2011 | Roed | ..................... | F03D 7/0248 416/169 R |
| 2011/0142626 A1* | 6/2011 | Hanson | ................... | F03D 1/003 416/9 |
| 2012/0318622 A1* | 12/2012 | Miller | ................... | F16D 65/186 188/71.7 |
| 2013/0056314 A1* | 3/2013 | Diaz De Cerio Garcia De Mendaza | ............. | F03D 7/0248 188/71.1 |
| 2013/0177423 A1* | 7/2013 | Pasquet | ................ | F03D 7/0224 416/153 |

* cited by examiner

*Primary Examiner* — Christopher Schwartz

(57) ABSTRACT

A dual-directions braking method of a disc brake, a braking mechanism and a braking system thereof are applied in fields of automobiles, trains and airplanes. The dual-directions braking mechanism includes a crankshaft having three concentric sections and two eccentric sections, two friction discs, a friction disc ring and at least a pair of brake calipers and friction pads, wherein the two eccentric sections are respectively provided between each neighboring two of the three concentric sections and mutually disposed at 180°; the two friction discs are respectively provided on the two eccentric sections; the friction disc ring is provided on the main section between the two eccentric sections. Through a translationally rotating friction by the two friction discs respectively with the friction disc ring and with the friction pads of each pair of brake calipers, a backward braking moment and a forward braking moment are simultaneously generated on the main sections.

4 Claims, 8 Drawing Sheets

DUAL-DIRECTIONS BRAKING METHOD OF DISC BRAKE, BRAKING MECHANISM AND BRAKING SYSTEM THEREOF

CROSS REFERENCE OF RELATED APPLICATION

This is a U.S. National Stage under 35 U.S.C 371 of the International Application PCT/CN2012/079070, filed Jul. 24, 2012.

BACKGROUND OF THE PRESENT INVENTION

1. Field of Invention

The present invention relates to a braking and safety control technology of various wheeled motor transportation vehicles, such as automobiles and trains, and also to a wheel braking and safety control technology of taking-off and landing aircrafts.

2. Description of Related Arts

The automobiles are the most typical among the various wheeled motor transportation vehicles, and also one of the major transportation vehicles for humans on the land. The application technologies and products related to the automobile driving braking safety are mainly divided into three types. The first type is the mechanical friction brake, which is further divided according to the structure and the principles into the disc brake and the drum brake. The disc brake is an open structure, which makes use of the friction between the static friction pads and the surface of the friction round disc which rotates circumferentially; the drum brake is a closed structure, which makes use of the friction between the static friction shoes and the cylindrical surface of the braking drum which rotates circumferentially. The friction medium of the disc brake and the drum brake are made of well wear-resistant and heat-resistant metal, semi-metal, few-metal or powder metallurgy composite friction materials. The second type is the automobile tire technology. The performance indicators of the tire technology mainly comprise the adhesive performance, the load bearing capacity, the wear resistance and the driving noise. Preferably, the synthetic rubber, the wide tires and the pattern design are all intended to improve the adhesion of the tires, namely the grip performance, and to ensure the safety and stability of the automobile driving and braking. The wide tires are able to improve the adhesion and load bearing capabilities, but also able to increase the inertia moment and the rolling friction, so as to increase the oil consumption of the automobile. The third type is the conventional automobile electronic safety braking control technology, typically comprising the three standardized application technologies of Anti-lock Braking System (ABS), Electric Brake Force Distribution (EBD) and Electronic Stability Program (ESP). The three standardized application technologies all belong to the electronic safety control method which makes use of the adhesive friction braking force generated between the tires and the road surface by the conventional mechanical friction backward brake, or the adhesive friction traction generated between the tires and the road surface by the motor-driven wheels. The three standardized application technologies all aim for improving the safety and stability in the automobile driving and braking under complicated traffic, which is also the main development direction for the current automobile electronic active safety control technology application and research.

With respect to the structural friction motion, the conventional disc brake has the circumferentially rotating friction which is generated between the friction pads of the brake caliper of the static operation part and the friction round disc surface on the concentric axis of the movable operation part; a disc brake of the present invention has translationally rotating friction which is simultaneously generated between friction pads of a brake caliper of a static operation part and friction round disc surfaces on two eccentric axes of a movable operation part, and between the friction round disc surfaces on the two eccentric axes of the movable operation part and a friction disc ring on a concentric axis. With respect to the energy type, the only energy conversion is from the mechanical friction into the heat energy. With respect to the braking method in the action direction of the braking moment of the brake, the conventional backward braking method only involves the backward braking moment; a dual-directions braking method of the present invention involves co-existing backward braking moment and forward braking moment. No matter for the conventional backward brake or for a dual-directions brake of the present invention, the working performance, the working stability, the wear resistance and the service life of the friction operation parts all depend on an operation pressure among the friction operation parts, a friction coefficient, a friction contact area, a relative motion velocity, a wear rate and an operation temperature.

The disc brake has at least one friction pair formed by the friction pads of the static operation part and the friction round disc surface of the movable operation part which mutually contact and rub with each other. During the operation, each friction pair has the friction disc generate at least one backward braking moment in the direction opposite to the rotation direction of the wheel. The friction of the generated backward braking moment is directly related to the normal force of each friction pair and the friction coefficient, and has nothing to do with the relative friction motion velocity of each friction pair. Given the friction coefficient of each friction pair unchanged, the operation friction of each friction pair is directly proportional to the normal force.

The relative friction motion on the friction round disc surface is the necessary and sufficient feature for the disc brake. The manner of the friction motion on the friction round disc surface determines the structure, the principles, the basic function and the application of the disc brake, and is the basic feature of the disc brake.

The disc brake and the drum brake, widely applied in the various wheeled motor transportation vehicles and the aircrafts, belong to the essential core safety operation part of the primary transportation vehicles in the human social production and life, such as the automobiles, the trains and the aircrafts. Every day, around the world, hundreds of millions of automobiles and tens of thousands of trains are running at high speed; tens of thousands of aircrafts are landing or taking off. The disc brakes or the drum brakes are working at times to ensure the safety in the running of the automobiles and the trains and in the landing and taking-off of the aircrafts, which is a matter concerning human lives.

Among the three primary transportation vehicles of the automobile, the train and the aircraft, the traffic of the road where the tires of the automobile wheels are adhered are the most complicated and volatile. The principles of brake mechanics of the automobile based on the adhesive force between the tires and the road surface determine the close action relationship between the disc brake, or the drum brake, and the wheels and tires of the automobile. Speaking from the angle of tribology, the adhesive force between the tires and the road surface is the friction between the tires and the road surface, which can be expressed by the friction equation (Amontons' Law) of $f=N\times\mu$, wherein f is the friction between the tire and the road surface (namely the adhesive force of the tire); N is the normal force between the tire and the road surface; and μ is the friction coefficient between the tire and the road surface (namely the adhesive coefficient of the tire). There are mainly three types of friction coefficients between the tire and the road surface: the coefficient of rolling friction $\mu_r$, the coefficient of dynamic friction $\mu_d$, and the coefficient of static friction $\mu_s$; correspondingly, there are mainly three types of friction: the rolling friction $f_r$, the dynamic friction $f_d$, and the static friction $f_s$. Since $\mu_r<\mu_d<\mu_s$, given a constant N, then $f_r<f_d<f_s$.

It seems not so difficult to understand the friction operation principles of the tires adhering onto the road surface which has been reached as a consensus by the worldwide automobile industrial giants. However, different countries have different technical application methods and ways. For example, in the aspects of driving safety, stability and comfort, the U.S. cars are inclined to have heavy chassis to increase the value of N; the German, French, British and Italian cars are inclined to have wide tires and designed tire patterns to increase the value of $\mu_s$. Regardless of the technical inclinations, the cars of the above countries all have the high-quality synthetic rubber tires to increase the static friction adhesive force between the tires and the road surface, namely the value of $f_s$, so as to ensure the safety and stability of car driving and braking. Japan has always focused on the economy of cars. In order to overcome the "common technical defect" in the above European and U.S. cars, at the outburst of the global oil crisis in the 1970s, Japan timely put forward the oil-saving economical car by reducing the car weight and narrowing the tire, and dominated the world largest U.S. automobile market and the partial European automobile market at once; since then, Japan has successfully become one of the worldwide automobile industrial giants. However, speaking from the angle of safety, the economical techniques of the Japanese car are not completely desirable.

To further explore from the angles of Newton' mechanics, the law of conservation of energy and the tribology, it is not so difficult to understand the tire braking mechanics principles of the conventional backward braking technology. The performance of automobile safety and braking mainly depends on both the braking moment of the backward brake of the automobile, and the friction adhesive force between the tires and the road surface. The larger friction adhesive force between the tires and the road surface, the shorter braking distance and braking time; otherwise, the braking distance and the braking time would be longer. Due to the restriction of the maximal friction adhesive force between the tires and the road surface, when the automobile brakes with the conventional backward brake technology, the automobile is able to brake safely via the maximal adhesive force of the tires only in the critical rolling and sliding friction condition below a certain slip rate percentage between the tires and the road surface. In the emergency braking, if the conventional backward brake owns an overlarge backward braking moment, the wheels would be locked up, which may induce the sliding friction when the slip rate percentage between the tires and the road surface is too large, so that the rubber tires would undergo the surge in temperature, the severe damage and the accelerated aging to shorten the service life and be exposed to the danger of potential flat tire. The sliding friction adhesive force between the tires and the road surface under the overlarge slip rate is smaller than the maximal friction adhesive force therebetween. Therefore, the locked up wheel brake would impair the automobile braking performance and elongate the braking distance and the braking time. Moreover, in the emergency braking, if the left tires and the right tires undergo different friction adhesion with the road surface, the locked up wheel brake would lead to the longitudinal sliding between the left/right tires and the road surface, and greatly lower the lateral friction adhesive force of the tires. As a result, the automobile may run astray or drift, or even turn over at one side, which is quite liable to cause major traffic accidents.

Based on the above knowledge about the principles of tire brake mechanics, in the 1930s, the German BOSCH put forward the well-known automobile safety brake technology, the ABS (Anti-lock Braking System). Actually, the ABS is an electronic safety brake control function which actively controls the maximal braking moment of the backward brake and prevents the wheels from being locked up during braking. In a pulse cycle control manner of "locking-loosening-relocking-reloosening", the ABS system maintains that the tires are always at a critical friction adhesion state to being locked up during the process of braking on the road surface, and efficiently takes advantage of the maximal friction adhesive force between the tires and the road surface to brake. The EBD (Electric Brake Force Distribution) technology, as a further supplement and perfection of the ABS, effectively prevents the automobile from running astray or drifting due to the uneven brake force distribution between the left tires and the right tires during the emergency braking, and greatly improves the safety and stability in the emergency braking. Along with the progress and development in the key technologies of digital computers and hydraulic pressure regulator, the improvement in the product reliability and the decrease in the production cost, the ABS+EBD braking technology started from Europe in the 1980s and gradually spread across the world. In the middle 1990s, the German BOSCH and BMW officially promoted the advanced ESP (Electronic Stability Program) technology. Even the advanced ESP which focuses on controlling the driving active safety and stability is still under the conventional backward braking technology based on the friction adhesive force between the tires and the road surface.

The train, the automobile and the aircraft, since emerging two hundred years ago, have developed into large-scale industries with the continually progressing design and manufacture, and especially the automobile industry develops at the highest speed. Due to the progress in the manufacture of auto parts and integration, the enlargement in the production and sales, the decrease in the production and manufacture costs, and the increase in the driving safety and stability, the automobile has become one of the most important vehicles in daily life, and the humans have entered the automobile civilization age. In the meantime, the automobile has posed a serious issue of transportation safety in front of the humans. Despite the fact that the various advanced, mature, safe and reliable driving and braking electronic control technologies have been widely applied, the automobile accidents are still happening everywhere and heard all the time, leaving the humans endless disasters and tears. The basic cause still lies in that the braking distance and the braking time of the conventional backward braking technology are too long to satisfy the safe emergency braking during the high-speed driving in the various complicated traffic, which is also the main reason why the current traffic accident rate still maintains high.

The train and the aircraft have relatively low traffic accident rates compared with the automobile. However, the train and the aircraft suffer from the similar braking safety hazard, since using the same conventional backward braking technology and sharing the same principles of brake mechanics and safety braking performance with the automobile.

Both CN 1769130A and CN 2866965Y disclose a dual-direction driving disc brake, which is capable of achieving dual-direction driving under the action of mechanical force. CN 101844192A discloses a high-speed forging mechanical dual-direction clutching brake device, which has lower transmission inertia, and reliable and stable combination and separation of the clutch, and is especially adapted for high-speed press machine. CN 101846148A discloses a disc brake, which is capable of stabilizing the filler blocks at both inner and outer sides, and reducing pulling and vibrating thereof. CN 101852256A discloses a disc braking apparatus, which is capable of stabilizing the performance of the braking filler blocks while braking the disc braking apparatus so as to restrain generating the braking noise, and reducing rolling moment of the barking filler blocks while braking the disc braking apparatus so as to restrain uneven wear and tear of the bearing strips. CN 102128223 A discloses an electronic brake which utilizes the vehicle kinetic energy to brake. Compared with the above Chinese Patents, the present invention has different structure and mechanical principle as follows. When the brake frictionally works, vehicle wheels not only make the friction forwardly to act on the road surface, but also acts on the road surface backwardly, thereby defining the dual-direction braking method of the vehicle wheels. It can be seen that the present invention is a new braking method of the vehicle wheels. An innovation in the conventional safety brake technology of the wheeled motor transportation vehicles is a particularly meaningful project which matters to a series of major social issues, such as the human life and property security. The present invention provides a solution to save the human life, reduce property loss, and lower the automobile traffic accident rate.

SUMMARY OF THE PRESENT INVENTION

An object of the present invention is to provide a dual-directions braking method of a disc brake, a dual-directions braking mechanism and an application thereof, so as to significantly improve automobile safety braking performance, adapt to conventional standardized electronic safety brake control technologies, lower a currently high traffic accident rate, and also be applied for braking and safety control of other wheeled motor transportation vehicles, such as trains, and landing/taking-off aircrafts.

Accordingly, in order to accomplish the above object, the present invention provides a dual-directions braking method of a disc brake, as well as a configuration and application of structural components, friction motion manners, principles of mechanics and functional performance. The dual-directions braking method comprises steps of: providing a brake which comprises a crankshaft having three concentric sections and two eccentric sections, two friction discs, a friction disc ring and at least a pair of brake calipers, wherein the two eccentric sections are respectively provided between each neighboring two of the three concentric sections and mutually disposed at 180°; the two friction discs are respectively provided on the two eccentric sections; the friction disc ring, provided on the concentric section between the two eccentric sections, is clamped between the two friction discs; and each pair of brake calipers has a pair of friction pads (friction pad pair, for short) with operation surfaces opposite to each other; simultaneously rubbing on the friction disc ring and on the operation surfaces of the friction pad pair of each pair of the brake calipers, by inner surfaces and outer surfaces of the two friction discs, and thus simultaneously generating dual-directions braking moments on the concentric sections, so as to accomplish braking by the brake. When the brake is at an idle state, no contact and no friction exists between the two friction discs and the operation surfaces of the friction pad pair of each pair of brake calipers; the two friction discs and the friction disc ring synchronously revolve with the crankshaft around an axis of the concentric sections, merely through the mutual rotating static friction between the two friction discs and the friction disc ring. When the brake is at work, the friction pad pair of each pair of brake calipers simultaneously exerts axial and opposite pressures onto the two friction discs and the operation surfaces of the friction disc ring, in such a manner that the two friction discs synchronously revolve around the axis of the three concentric sections of the crankshaft in a revolving direction, while the two friction discs respectively rotate around two axes of the two eccentric sections of the crankshaft in a direction opposite to the revolving direction; and also that the friction disc ring synchronously rotates around the axis of the three concentric sections in the direction opposite to the revolving direction. Therefore, among the two friction discs, the friction pads of each pair of brake calipers, and the operation surfaces of the friction disc ring, a synchronous translationally rotating friction is formed, and an angular velocity and moment restriction mechanism of the synchronous translationally rotating friction of the two friction discs is established. As a result, a backward braking moment in a direction opposite to a rotation direction of the concentric sections of the crankshaft and a forward braking moment in a direction identical to the rotation direction thereof are simultaneously and respectively generated by the concentric sections of the crankshaft. When the backward braking moment is twice of the forward braking moment, under the same operation conditions, the brake of the present invention obtains expected dual-directions braking performance three times of a braking performance of a conventional automobile backward brake.

The present invention further provides a dual-directions braking mechanism of the dual-directions braking method of the disc brake. The dual-directions braking mechanism comprises: a crankshaft which comprises three concentric sections and two eccentric sections, two friction discs, a friction disc ring, a wheel mounting flange, at least a pair of brake calipers and corresponding caliper mounting frames. The two eccentric sections are mutually disposed at 180°, and provided between each neighboring two of the three concentric sections. Two of the three concentric sections are provided at two ends of the crankshaft, and the rest one of the three concentric sections is provided between the two eccentric sections. The two friction discs are respectively provided on the two eccentric sections. The friction disc ring, provided on the concentric section between the two eccentric sections, is clamped between the two friction discs, so that two surfaces of the two friction discs obtain identical capabilities for bearing an operation pressure along axial directions of the two eccentric sections while obtaining operation abilities with bidirectional braking moments in a rotation direction of the three concentric sections. The two concentric sections at the two ends of the crankshaft are respectively adapted to mount the wheel mounting flange and for a rotary connection to bearings of a wheel shaft. The pair of brake calipers comprises a friction pad pair whose operation surfaces are opposite to each other, and at least a hydraulic wheel cylinder for supplying the friction pad pair with opposite operation pressures to ensure that the operation surfaces of the friction pad pair are both able to contact and rub with the two surfaces of the two friction discs when the friction pad pair is at work. All of the caliper mounting frames are fixedly connected to or integrated with a static sleeve of the wheel shaft. Each pair of brake calipers is mounted on the corresponding caliper mounting frame, in such a manner that the hydraulic wheel cylinders and the friction pad pair are able to simultaneously provide the operation surfaces between the two friction discs and the friction disc ring with the axial operation pressure. When the braking mechanism is idle, namely at a non-operational recovery state, no contact and no friction exists between the two friction discs and the operation surface of the friction pad pair of each pair of brake calipers; the two friction discs and the friction disc ring synchronously revolve with the crankshaft around an axis of the three concentric sections merely through the mutual rotating static friction, and have no braking moment on the concentric sections. When the braking mechanism starts to operate, in accordance to an instant rotation velocity of the three concentric sections of the crankshaft, firstly the hydraulic wheel cylinder of each pair of brake calipers synchronously generates a "rising slope wave pressure", and drives the friction pad pair to move towards each other so that the operation surfaces of the friction pad pair of the pair of brake calipers contact with the two friction discs at the same time and generate the axial operation pressure. Under the axial operation pressure, the two friction discs start to revolve synchronously around the axis of the three concentric sections in a revolving direction, and meanwhile rotate respectively around two axes of the two eccentric sections of the crankshaft in a direction opposite to the revolving direction; in the meantime, the friction disc ring rotates around the axis of the three concentric sections in the direction opposite to the revolving direction. Therefore, between the two friction discs and the operation surfaces of the friction pad pair of each pair of brake calipers, and between the two friction discs and the operation surfaces of the friction disc ring, a translationally rotating friction instant impulse process, which is inherent when the braking mechanism starts to operate, is formed synchronously. When the two friction discs finish the translationally rotating friction instant impulse process and readily enter a translationally rotating friction stable operation process, the hydraulic wheel cylinder readily stops generating the "rising slope wave pressure", and readily generates an operation pressure of an arbitrary waveform which is exerted onto the friction pad pair of each pair of brake calipers, the two friction discs and the friction disc ring, so as to ensure the translationally rotating friction stable operation of the two friction discs. Accordingly, a backward braking moment in a direction opposite to the rotation direction of the concentric sections of the crankshaft and a forward braking moment in a direction identical to the rotation direction thereof are generated simultaneously and respectively by the concentric sections of the crankshaft. When the backward braking moment is twice of the forward braking moment, under the same operation conditions, the dual-directions braking mechanism of the present invention obtains an expected dual-directions braking performance three times of the braking performance of the conventional automobile backward brake. When the braking mechanism finishes operating, in accordance to the instant rotation velocity of the three concentric sections of the crankshaft, the hydraulic wheel cylinder of each pair of brake calipers synchronously generates a "falling slope wave pressure" with a variable slope, so as to rapidly finish a translationally rotating friction instant impulse process, which is inherent when the braking mechanism finishes operating, among the friction pad pair, the two friction discs and the friction disc ring. Then, the friction pad pair of each pair of brake calipers is synchronously separated from the operation surfaces of the two friction discs; the two friction discs and the friction disc ring simultaneously stop rotating in the direction opposite to the revolving direction around the crankshaft and actively returns to the non-operational recovery state.

In the dual-directions braking mechanism of the present invention, rolling bearings are connected between the two friction discs and the corresponding eccentric sections of the crankshaft, and between the friction disc ring and the corresponding concentric section of the crankshaft. The rolling bearings are for reducing rotating friction between the two friction discs and the corresponding eccentric sections of the crankshaft, and between the friction disc ring and the corresponding concentric section of the crankshaft, which facilitates simultaneously generating the dual-directions braking moments on the concentric sections through the translationally rotating friction between the two frictions discs and the friction disc ring and through the moments on the two eccentric sections.

In order to utilize the expected dual-directions braking performance of the dual-directions braking mechanism and adapt the dual-directions braking mechanism for conventional automobile standardized electronic safety control technologies, such as ABS, EBD and ESP, the present invention provides an automobile dual-directions braking system which comprises: four of the dual-directions braking mechanisms which are respectively provided within four wheel hubs, four wheel speed sensors which are respectively provided for four wheels; an electronic control unit comprising a microprocessor, a steering angle sensor, a yaw rate sensor, a lateral acceleration sensor and a mechanical electronic brake pedal; a brake hydraulic device which is controlled by the electronic control unit to generate "slope wave pressure" with variable rising and falling pressure slopes, for supplying the hydraulic wheel cylinder of each pair of brake calipers on each braking mechanism with operation pressure, wherein the brake hydraulic device comprises hydraulic adjustment elements comprising a plurality of pressure-limiting valves and proportional valves based on a brake hydraulic controller technology of conventionally advanced and mature ESP; a plurality of electronic detection input interfaces, provided in the electronic control unit, respectively and correspondingly provided for each wheel speed sensor, the steering angle sensor, the yaw-rate sensor, the lateral acceleration sensor and the mechanical electronic brake pedal; a plurality of electronic control output interfaces correspondingly provided for the brake hydraulic device; and a standard communication bus interface, for satisfying requirements of various real-time input detection, output and communication control of the automobile dual-directions braking system.

When the dual-directions braking system operates at an automobile driving state, firstly the electronic control unit detects out an operation voltage signal of the mechanical electronic brake pedal through the electronic detection input interface; based on the instant wheel speed detected in real time by each of the wheel speed sensors and the corresponding electronic detection input interfaces, the electronic control unit actively controls the brake hydraulic device to synchronously generate the "rising slope wave pressure" for the hydraulic wheel cylinder on each dual-directions braking mechanism, so as to induce and control a response time and an impulse intensity of the translationally rotating friction instant impulse process when the dual-directions braking mechanism starts to operate, so that each dual-directions braking mechanism is able to synchronously and rapidly enter the translationally rotating friction stable operation process. Once each of the four dual-directions braking mechanism synchronously finishes the translationally rotating friction instant impulse process and enters the translationally rotating friction stable operation process, through the electronic control output interfaces, the electronic control unit actively adjusts the pressure-limiting valve and the proportional valve in the brake hydraulic device, and readily stops inducing by the "rising slope wave pressure"; in the meantime, the brake hydraulic device is controlled by the electronic control unit to readily and synchronously generate the operation pressures of arbitrary waveforms for each dual-directions braking mechanism, wherein the operation pressures change in real time with an operation stroke of the mechanical electronic brake pedal, so as to increase, decrease or maintain the operation pressures for each dual-directions braking mechanism. Accordingly, each dual-directions braking mechanism generates the corresponding backward and forward braking moments and the dual-directions braking effect during the translationally rotating friction stable operation process, until the operation voltage signal of the mechanical electronic brake pedal is canceled. When the electronic control unit detects via the electronic detection input interfaces that the operation voltage signal of the mechanical electronic brake pedal is canceled, the electronic control unit controls the brake hydraulic device through the electronic output control interfaces based on the instant wheel speed detected in real time by each of the wheel speed sensors and the corresponding electronic detection input interfaces. The brake hydraulic device is controlled by the electronic control unit to generate the "falling slope wave pressure" whose slope is proportional to the instant wheel speed, in such a manner that each dual-directions braking mechanism rapidly finishes the translationally rotating friction instant impulse process, which is inherent when the braking mechanism finishes operating, and synchronously and actively returns to the non-operational recovery state.

When each dual-directions braking mechanism in the dual-directions braking system is in the synchronous translationally rotating friction stable operation process, based on a series of real-time active detection, computing, judgment and control which comprises the real-time detection by each wheel speed sensor on the wheels, the real-time computing and judgment about each tire slip rate on a road surface, and the dual-directions braking moments on each dual-directions braking mechanism, the electronic control unit controls a dual-directions anti-lock braking system (DABS) and a dual-directions electric brake force distribution (DEBD) of each wheel, so as to avoid a sliding friction in an emergency braking due to surpassing a maximal friction adhesive force of each tire on the road surface and an uneven distribution of dual-directions braking force on each tire. Otherwise, the automobile would encounter steering failure, run astray or drift. The dual-directions braking system of the present invention improves safety and reliability of the automobile.

When the dual-directions braking system operates at the automobile driving state, if the electronic control unit actively detects out an oversteer or an understeer of front wheels, via the real-time detections by the wheel speed sensors, the steering angle sensor, the yaw-rate sensor, the lateral acceleration sensor and the corresponding electronic detection input interfaces, and real-time high-speed computing and analysis about driving stability of the automobile, upon a precursor of unstable driving, the electronic control unit actively controls the operation pressures from the brake hydraulic device required for the translationally rotating friction instant impulse process, which is inherent when each dual-direction braking mechanism starts to operate, and for the translationally rotating friction stable operation process, takes advantage of the dual-directions braking performance in a wide dynamic range of each dual-directions braking mechanism on a basis of an active control of the DABS and the DEBD, and combines the real-time active control method for the dual-directions braking moments by each dual-directions braking mechanism with a wheel driving torque control method of a traction control system (TCS) or an acceleration slip regulation (ASR) system which is accomplished by real-time communications with a conventional automobile engine management system via the standard communication bus interface, so as to readily rectify driving attitudes in real time, such as the steering failure, the running astray and the drifting. Therefore, the dual-directions electronic stability program DESP has a function of the active safety control, so as to further improve the safety and stability of the automobile driving.

Compared to the backward brake of the conventional backward braking method, the dual-directions braking method of the disc brake and the dual-directions braking mechanism, provided by the present invention, based on the friction between the tires and the road surface, improve the braking effect and the brake deceleration twice, and shorten the braking distance and the braking time by two thirds, while keeping the braking friction load between the tires and the road surface unchanged. The dual-directions braking system, provided by the present invention, is able to accomplish the electronic safety control functions of the translationally rotating friction instant impulse processes, which are inherent when the braking mechanism starts to operate and finishes operating, the DABS, the DEBD and the DESP, greatly improve the active safety of the automobile traffic and greatly reduce the traffic accident rate. The dual-directions braking mechanism and the dual-directions braking system, provided by the present invention, are also able to overcome the potential safety hazard in a braking control application of various wheeled motor transportation vehicles, such as trains and landing/taking-off aircrafts.

DETAILED DESCRIPTION OF THE PREFERRED EMBODIMENT

In order to facilitate specifically applying and understanding a dual-directions braking method, a dual-direction braking mechanism and applications thereof of the present invention, the drawings showing structural components in the preferred embodiment for automobiles of the present invention are first briefly illustrated as follows.

Figure 1:
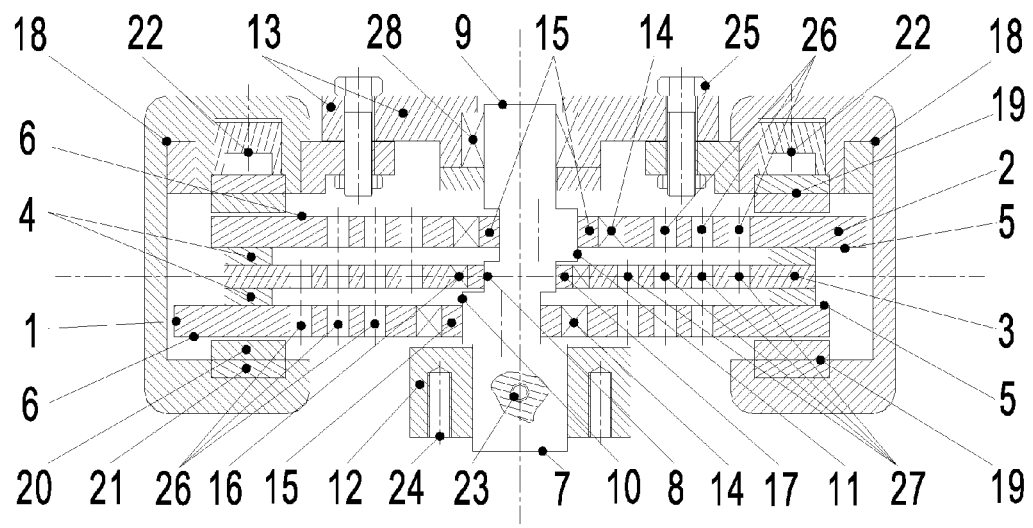
FIG. 1 is a top axial sectional view of a dual-directions braking mechanism according to a preferred embodiment of the present invention.

FIG. 1 is a top axial sectional view of a dual-directions braking mechanism (at a non-operational recovery state) according to a preferred embodiment of the present invention, which is illustrated as follows.

A crankshaft comprises: a first main section 7, a second main section 8, a third main section 9; and two eccentric sections 10 and 11 mutually disposed at 180° with each other. Two identical friction discs 1 and 2 are respectively provided on the two eccentric sections 10 and 11. Each of the two friction discs has an inner surface 5 and an outer surface 6. A friction disc ring 3 is mounted on the second main section 8. Two symmetrical cylindrical-ring-shaped friction rings 4 are integrated on two sides of the friction disc ring 3. The friction disc ring 3 is clamped between the two friction discs 1 and 2, in such a manner that the two friction discs are able to axially bear operation pressures and generate dual-directions braking moments along the three main sections. First rolling bearings 14 and 16 respectively of the two friction discs and the friction disc ring, and two half-annular-cylinder combined sleeves 15 and 17 respectively of the two friction discs and the friction disc ring, are for rotatably and detachably connecting the two friction discs and the friction disc ring respectively between the two eccentric sections, 10 and 11, and the second main section 8. A wheel mounting flange 12 is, namely, specially provided to mount a wheel hub. A first screw bolt and a corresponding first screw thread hole 23 are radially provided between the first main section 7 at an outer end of the crankshaft and the wheel mounting flange 12, for mounting and limiting the wheel mounting flange 12 with the first main section 7 at the outer end of the crankshaft. The wheel mounting flange has a second screw thread hole 24 provided in an axial direction of the first main section 7 for mounting the wheel hub. A caliper mounting frame 13 and the sleeve surrounding around the first rolling bearings on the third main section 9 at an inner end of the crankshaft are integrated rigidly together, for mounting brake calipers. Two pairs of brake calipers 18 are provided in a horizontal symmetry and each pair of brake calipers have a pair of friction pads 19 (friction pad pair, for short). The friction pad comprises a steel matrix strength metal material layer 21 and a friction material layer 20. A single hydraulic wheel cylinder 22 is provided for two pairs of brake calipers, or double hydraulic wheel cylinders 22 are provided at one side of the brake calipers to provide the two friction discs with a larger and more even axial operation pressures. A second screw bolt and a corresponding screw nut 25 are for mounting the brake calipers with the caliper mounting frame. The two friction discs and the friction disc ring respectively have axial through-holes, 26 and 27, for ventilating and reducing weight. Second rolling bearings 28 are provided around the third main section 9 of the crankshaft.

Detailed structures of the brake calipers and the friction pad pair are unshown in FIG. 1, and are identical to brake calipers of a conventional automobile disc brake.

Figure 2:
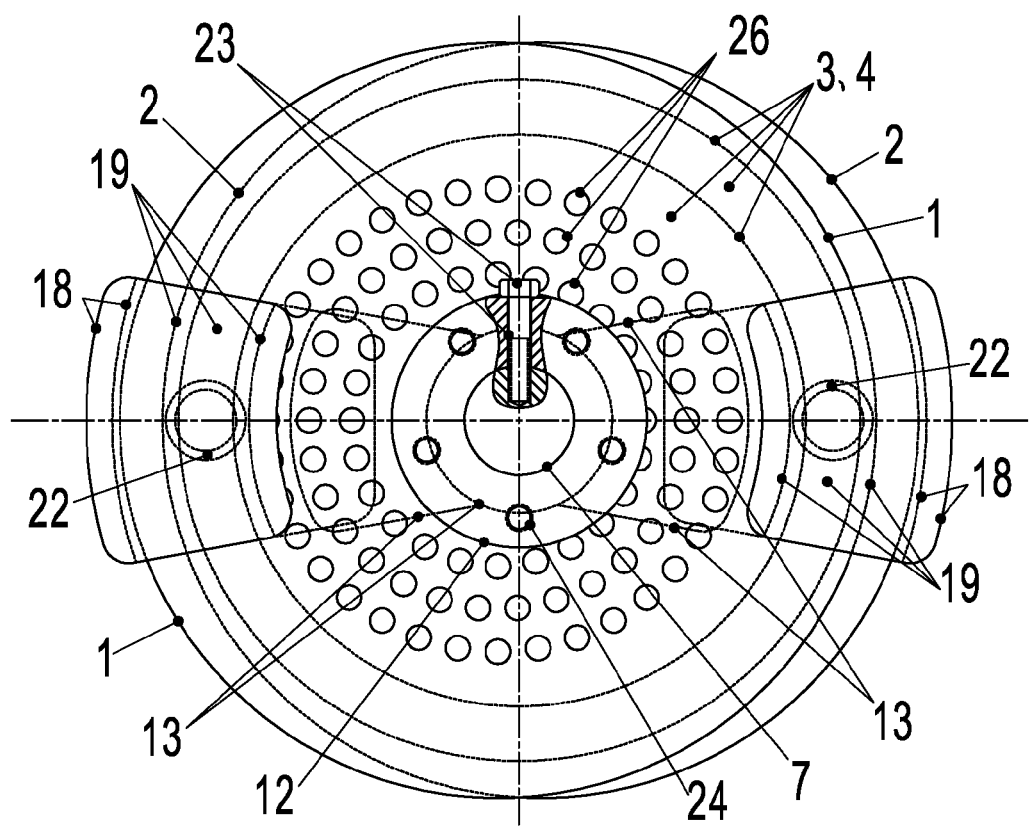
FIG. 2 is an axial plan view of the dual-directions braking mechanism according to the preferred embodiment of the present invention.

FIG. 2 is an axial plan view of the dual-directions braking mechanism (observed from an outside of a wheel towards an inside thereof along an axial direction of the wheel) according to the preferred embodiment of the present invention, which is illustrated as follows.

1 and 2—the two friction discs; 3 and 4—the friction disc ring, and the two symmetrical cylindrical-ring-shaped friction rings at the two sides of the friction disc ring; 7—the first main section at the outer end of the crankshaft; 12—the wheel mounting flange; 23—the first screw bolt and the corresponding first screw thread hole radially provided between the main section and the wheel mounting flange; 24—the second screw thread hole in the axial direction on the wheel mounting flange; 18—the two pairs of brake calipers provided in horizontal symmetry, for generating even and sufficient axial operation pressures between inner and outer friction pair operation surfaces; 13—the caliper mounting frame; 19—the friction pad pair on the brake calipers; 22—the hydraulic wheel cylinder on the brake calipers; 25—the second screw bolt and the corresponding screw nut on the brake calipers, for mounting the brake calipers with the caliper mounting frame; and 26—the axial through-holes for ventilating and reducing weight on one of the two friction discs.

Figure 3:
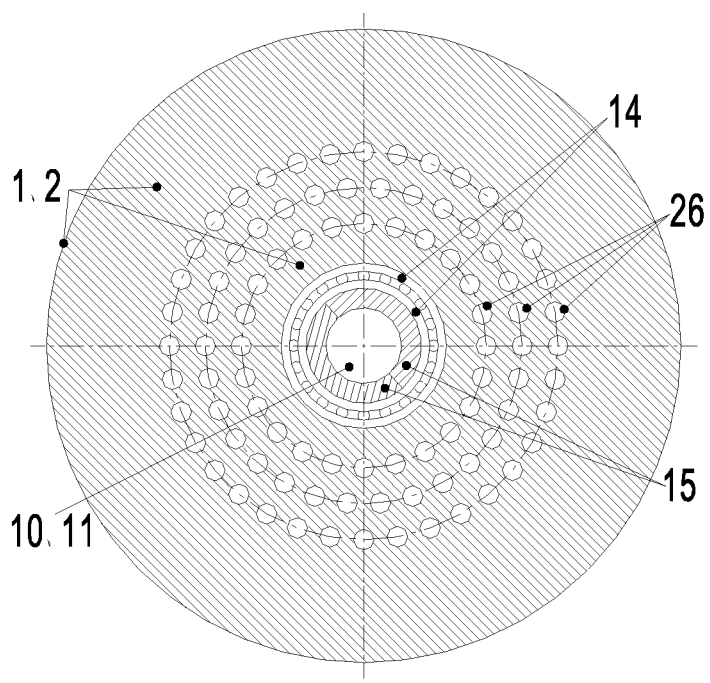
FIG. 3 is an axial plan view of two friction discs of the dual-directions braking mechanism according to the preferred embodiment of the present invention.

Referring to FIG. 3, according to the preferred embodiment of the present invention, an axial plan view of the two friction discs is illustrated as follows, wherein: 1 and 2—the two identical friction discs; 10 and 11—the two eccentric sections; 14—the first rolling bearings of the friction disc; 15—the two half-annular-cylinder combined sleeves of the two friction discs, for rotatably and detachably connecting the two friction discs respectively to the two eccentric sections 10 and 11; and 26—the axial through-holes for ventilating and reducing weight on the two friction discs. The two friction discs are symmetrically designed for ensuring a good dynamic balance performance of the two friction discs; and also for reducing types of operation parts, improving universality and exchangeability of the operation parts, facilitating mass production and quality control, and reducing costs in production, storage, management, transportation and maintenance.

Figure 4:
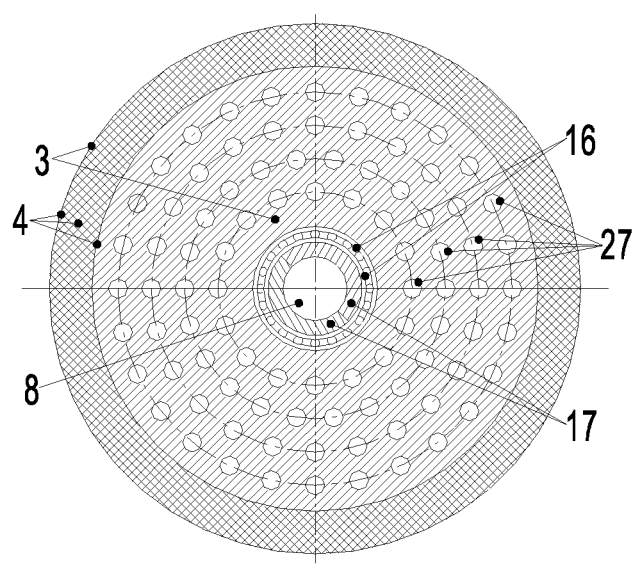
FIG. 4 is an axial plan view of a friction disc ring of the dual-directions braking mechanism according to the preferred embodiment of the present invention.

Referring to FIG. 4, according to the preferred embodiment of the present invention, an axial plan view of the friction disc ring of the dual-directions braking mechanism is illustrated as follows, wherein: 3—the friction disc ring; 4—the two symmetrical cylindrical-ring-shaped friction rings at the two sides of the friction disc ring; 8—the second main section where the friction disc ring is provided; 16—the first rolling bearings of the friction disc ring; 17—the two half-annular-cylinder combined sleeves of the friction disc ring, for rotatably and detachably connecting the friction disc ring to the second main section 8; and 27—the axial through-holes for ventilating and reducing weight on the friction disc ring.

Referring to FIGS. 1, 2, 3 and 4, the dual-directions braking mechanism is further illustrated in aspects of structural design, material choice and preparation method.

With reference to the drawings, compared to an open structure of a conventional automobile disc brake, a disc brake of the present invention shares some common structure and appearance with the conventional automobile disc brake, but essentially differs from the conventional automobile disc brake in that a friction disc of the conventional automobile disc brake has a circumferentially rotating friction around a wheel axis, while the two friction discs of the dual-directions braking mechanism of the present invention respectively have a translationally rotating friction around two axes of the two eccentric sections which are disposed at 180° with each other. The two friction discs, the friction disc ring, the crankshaft, the two pairs of brake calipers and the two friction pad pairs thereof are the four core members of the dual-directions braking mechanism of the present invention. The outer surfaces of the two friction discs form four outer friction pairs with operation surfaces of the two friction pad pairs of the two pairs of brake calipers. The inner surfaces of the two friction discs form two inner friction pairs respectively with operation surfaces of the symmetrical cylindrical-ring-shaped friction rings at the two sides of the friction disc ring. In total the six friction pairs of the dual-directions braking mechanism share a duty of converting mechanical friction into heat and all have relatively large friction operation areas.

Therefore, according to the preferred embodiment of the present invention, the dual-directions braking mechanism has the multiple friction pairs which are symmetrically arranged and have the large friction operation areas, so that the six friction pairs have high friction load tolerance, good heat resistance and good wear resistance. The two pairs of brake calipers are provided in horizontal symmetry, for providing the translationally rotating friction among the operation surfaces of the six friction pairs with the even and sufficient axial operation pressure.

The friction material of the inner and the outer friction pairs and the preparation method thereof are as follows. For a choice about the friction material of the inner and the outer friction pairs, not only an anti-heat-fade property, a soaking recovery property and a wear resistance are required, but also an appropriate density, a low aggression between mating friction materials, a good corrosion resistance, a high friction coefficient and an appropriate price are taken into consideration. The friction materials with a relatively large friction coefficient are favorable to an increase in an operational friction of the friction pair, but usually have a relatively large wear rate and are liable to generate brake noise. The above problems are common in the conventional mechanical friction brake. Therefore, according to the preferred embodiment of the present invention, the mating friction materials of the six friction pairs of the dual-directions braking mechanism are as follows.

The two friction discs are totally identical, made of a grey cast iron material of G3000 (U.S. standard) or HT250 (Chinese standard) with an anti-tensile strength larger than 220 MPa, or other more suitable metal materials such as an alloy cast iron material with a higher wear resistance, a higher heat capacity, a higher heat resistance and a better yield strength, and prepared by casting and machining as a brake disc of the conventional automobile disc brake. Choosing, designing and machining the two pairs of friction pads of the brake calipers, and the steel matrix strength metal material and the friction material of the friction disc ring can be accomplished with reference to choosing, designing and machining the friction pad pair of the brake caliper of the conventional automobile disc brake. The steel matrix strength metal material can be a metal material with a good comprehensive performance, such as forged steel. The friction material can be powder metallurgy, low metal (NAO) or other more suitable composite friction materials which satisfy a mechanical strength requirement of friction operation of the dual-directions braking mechanism; for example, the friction material can be made of light C-C and SiC high-performance friction material. With reference to compression molding and sintering of the friction pad pair of the conventional automobile brake calipers or other more economical and mature preparation methods, according to requirements of service life and mechanical strength of the dual-directions braking mechanism, the friction material of a certain axial width is machined respectively onto the steel matrix strength metal material of a sufficient axial width, so as to form the six friction pairs having dynamic friction coefficients ranging from 0.32 to 0.42 with the inner surfaces and the outer surfaces of the two friction discs. An inner cylinder radius and an outer cylinder radius of the friction ring of the friction disc ring are properly designed so as to allow the symmetrical cylindrical-ring-shaped friction rings at the two sides of the friction disc ring to be away from the bearings of the two friction discs as far as possible, to satisfy the axial operation pressure bearing requirement of the two friction discs, and to have more axial through-holes for ventilating and reducing weight on the two friction discs and the friction disc ring.

With reference to the design and manufacture of the conventional automobile disc brake, the crankshaft, the brake calipers, the caliper mounting frame and the wheel mounting flange of the present invention are made of forged steel or other appropriate steel with a good mechanical strength and a good corrosion resistance, economically processed by forging and pressing, casting, lathing, milling, planing, grinding, wire electrical discharge machining. The brake calipers of the present invention can be directly embodied as brake calipers of the conventional automobile disc brake, or embodied as the brake calipers of the conventional automobile disc brake after changing a distance between mutually opposite operation surfaces of a friction pad pair thereof and changing a center of a friction operation surface thereof.

The first rolling bearings of the two friction discs and the friction disc ring are chosen and designed as follows. A car or a light bus, used in the largest amount, is taken as an example. A highest speed is usually designed to be 185 Km/h; a highest rotation speed of wheels and main sections of a crankshaft is designed to be 1500 rpm which is also a designed mutually opposite revolution speed in the translationally rotating friction between the two friction discs and the friction disc ring, which constitute worst high-temperature, high-pressure and high-rotation-speed operation limit conditions for the bearings of the two friction discs to sustain in a high-speed emergency braking by the dual-directions braking mechanism. Due to restrictions by various transportation laws and rules in different countries, the automobiles barely have a chance to run at the designed highest speed and brake in emergency; and thus, the bearings of the two friction discs seldom have a chance to encounter the worst operation limit conditions. No matter in the urban and the rural areas or on the highway, the automobiles are usually restricted under 120 Km/h, wherein the bearings of the friction discs are correspondingly restricted under 970 rpm;

the automobiles commonly run at a speed lower than 80 Km/h, wherein the bearings of the friction discs correspondingly rotate at 650 rpm. When the automobile is running normally, the dual-directions braking mechanism may operate frequently, but each time the dual-directions braking mechanism operates in a short time and seldom needs an emergency braking. Even if the automobile encounters an emergency and brakes suddenly, the bearings of the two friction discs sustain a great operation pressure, but the operation rotation speed and the operation temperature would not be too high. Therefore, the first rolling bearings of the two friction discs are always operating under relatively low bearing in a long term. Compared to braking on flat roads, braking on long slopes is another bad condition for the bearings of the two friction discs. When the automobile brake on the long slope, although the bearings of the two friction discs are required to work for a long time under high temperature, experienced drivers can utilize an engine and a transmission to control and slow down the automobile, so that the bearings of the two friction discs intermittently operate under relatively low operation pressure and rotation speed, which relieves an actual operation load onto the bearings on the long slope.

From the above brief analysis, operation reliability and a service life of the dual-directions braking mechanism mainly depend on the operation temperature and the radial pressure load of the bearings of the two friction discs. In the preferred embodiment of the present invention, according to a structure and an operation environment of the dual-directions braking mechanism, when the braking mechanism is in a translationally rotating friction stable operation, the radial operation pressure onto the bearings of the friction disc ring is basically at a mechanical equilibrium, and the operation load onto the bearings is small. Therefore, the bearings are preferred to be wall-thinned deep groove rolling bearings with a small pressure load parameter. The operation load of the dual-directions braking mechanism is shared by the bearings on the two eccentric sections of the two friction discs; however, considering the large radial operation pressure load of the two bearings on the two eccentric sections, the first rolling bearings of the two friction discs are preferred to be sealed maintenance-free deep groove ball bearings or sealed maintenance-free wall-thinned deep groove ball bearings which have larger inner diameters and good comprehensive parameters in aspects of radial dynamic load, noise, rotation speed and temperature. A lubricant for the bearings of the two friction discs is embodied as a high-temperature grease for resisting 400° C., in such a manner that the first rolling bearings of the two friction discs are able to bear a great load. If financially permitted, the first rolling bearings of the two friction discs can also be embodied as deep groove ceramic balls bearings with excellent comprehensive performance. When the two pairs of brake calipers are synchronously and oppositely applying forces, the two pairs of brake calipers may occasionally generate small and unbalanced axial forces onto the two friction discs and the first rolling bearings. Besides the radial dynamic load, an axial load-bearing capability of the first rolling bearings of the two friction discs also plays a crucial role in coping with the small and unbalanced axial forces, which explains the preference for the deep groove ball bearings.

Ventilation, heat dissipation and weight reducing of the two friction discs and the friction disc ring are designed as follows. The two friction discs are made of the grey cast iron or the alloy cast iron. The friction disc ring is made of the steel matrix strength metal material, such as the forged steel, and the friction material. The two friction discs and the friction disc ring have a certain weight; the metal materials thereof have high coefficients of thermal conductivity; the two friction discs have large heat dissipating areas. As a result, the two friction discs and the friction disc ring have a certain capability of heat capacity. The inner and the outer friction pairs operate and generate heat; most of the heat is absorbed by the two friction discs and the friction disc ring, and timely dissipated into the air via a thermal radiation and an air convection of the two friction discs. The axial width of the friction disc ring contributes to improving an internal ventilation and heat dissipation structure between the two friction discs, compared to a ventilation brake disc of the conventional disc brake, and also strengthening the ventilation and the heat dissipation of the two friction discs and the friction disc ring. In order to further improve the ventilation and the heat dissipation of the two friction discs and the friction disc ring and efficiently increase a thermal resistance for the heat generated by the friction between the two friction discs and the friction disc ring to transfer towards the bearings, axial non-operational surfaces of the two friction discs and the friction disc ring also have the through-holes for ventilating and reducing weight under a permission of a structural strength. Moreover, in the preferred embodiment of the present invention, the two friction discs and the friction disc ring can be made of cheap and light metal strength material and friction material, so as to reduce useless weight, moment of inertia and brake response time of the two friction discs and the friction disc ring.

The above design about the ventilation and the weight reducing of the two friction discs and the friction disc ring is able to efficiently control the actual operation temperature of the first rolling bearings of the two friction discs and the friction disc ring, which not only reduces impact on an operation stability of the friction coefficient of the friction material brought by an over-high operation temperature of the inner and the outer friction pairs, but also provides a favorable application environment through lubrication and protection for the first rolling bearings of the two friction discs and the friction disc ring.

Through the above brief analysis, choosing and machining the friction material of the inner and the outer friction pairs, and choosing the first rolling bearings of the two friction discs are two key factors for an application of the dual-directions braking mechanism in the preferred embodiment of the present invention. Therefore, the friction material qualified for the present invention is desirably manufactured to have high polymer compounds as a binder, inorganic or organic fibers as an enhancement component, and mineral powders and organic powders as a friction performance modifier, in the mature, economical and advanced manner of compression molding and sintering; the high-temperature resistant, high-pressure resistance and high-reliability rolling bearings qualified for the present invention is desirably manufactured with advanced materials, preparation methods and design.

In order to further illustrate the preferred embodiment of the present invention, besides the above brief illustration, a dual-directions braking method, working principles of the dual-directions braking mechanism and related analyses and designs thereof will become apparent from the following detailed description and the accompanying drawings.

Figure 5:
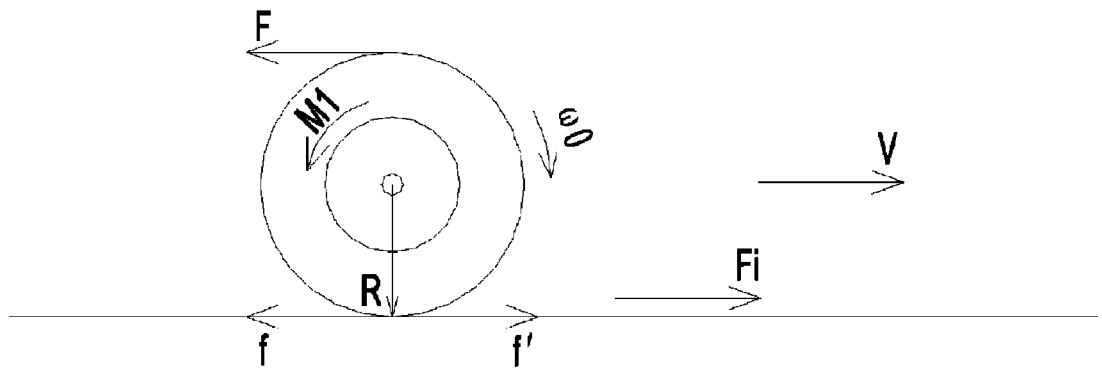
FIG. 5 is a sketch view illustrating principles of brake mechanics, tire frictional stress analysis and physical motion process of a conventional backward braking method according to prior arts.

Referring to FIG. 5, principles of brake mechanics, tire brake frictional stress analysis and physical motion process of an automobile conventional backward braking method are as follows.

When an automobile conventional backward brake system operates, a main cylinder generates operation pressure which is applied respectively via a wheel cylinder on a disc brake (drum brake) onto static friction pads (brake shoes) and operation surfaces of a circumferentially rotating brake disc (brake drum) coaxially connected to a wheel rotation axis. With circumferentially rotating friction, the brake disc (brake drum) merely generates a backward braking moment in a direction opposite to a rotation direction of the brake disc, which is why the automobile conventional braking method is named as the backward braking method.

The brake disc (the brake drum) generates the backward braking moment M1, wherein the wheel rotation axis is an action axis for the backward braking moment; correspondingly, a backward braking force F is generated on a tire periphery surface. M1=F×R, wherein R is a radius of the tire periphery surface. Taking a road surface (namely the earth) as a reference frame for a motion of the automobile, M1=F×R is the only wheel backward braking moment in an automobile motion inertial reference frame. Under an action of M1, the wheel tire (force applying member) generates a forward action force F relative to the road surface (force receiving member), so that the wheel tire generates a forward friction force f' relative to the road surface. F=f', wherein the forward friction force f' is equal to a forward motion inertial force of the automobile along a motion direction generated by the wheel backward braking moment M1=F×R in the automobile motion inertial reference frame. According to Newton's third law (action and reaction), the road surface exerts a backward repulse braking force which is equal and opposite to the forward action force F. The backward repulse braking force is equal to a backward friction f generated by the road surface as a reaction to the wheel tire friction; namely, f=f'=F. Therefore, the only wheel backward braking moment M1=F×R in the automobile motion inertial reference frame is only able to generate a forward motion inertial force Fi equal to the forward friction f', Fi=f', on the automobile along the motion direction, through mutual friction f' and f between the wheel tire (the automobile motion inertial reference frame) and the road surface (reference frame for the motion of the automobile), and meanwhile generate the backward repulse braking force equal to the backward friction f opposite to the motion direction. The backward friction f on the wheel tire forms a moment f×R in the same direction with a wheel rotation. When the backward brake operates, in order to maintain the wheel rotation, given that fmax is a maximum of f and f', according to principles of moment equilibrium of the wheel, a moment equilibrium equation of f×R=F×R must be established, as well as an equation as follows.

$$f=F=f'\le fmax \quad (a)$$

In the conventional backward braking method, when the backward braking moment M1=F×R has not been generated by the wheel, according to Newton's first law of motion, also known as the law of inertia, the automobile would maintain a straight motion. In other words, in the automobile motion inertial reference frame, a forward motion inertial force of the automobile is not manifested, not working, and not consuming kinetic energy of the automobile along a motion displacement direction of the automobile, which is a representation form of an existence of the motion inertia of the automobile.

However, when the wheel generates the backward braking moment M1=F×R so that the backward repulse braking force equal to f and the forward motion inertial force equal to f' are simultaneously generated between the tire and the road surface, as the forward motion inertial force equal to f' is manifested and working along the motion displacement direction of the automobile, the forward motion inertial force certainly consumes the kinetic energy of the automobile. As a result, a motion state of the automobile, namely a motion speed, certainly changes, which is another representation form of the existence of the motion inertia of the automobile.

A correct knowledge about a systematic analysis method and mutual action forces of the automobile motion inertial reference frame and the reference frame for the motion of the automobile plays a particularly important role in understanding a nature of the automobile tire braking mechanics and the following illustration about the dual-directions braking method of the present invention.

Herein, supposing that the automobile has a weight of M and a braking deceleration of a, according to Newton's second law of motion (basic expression), an equation as follows is obtained.

$$a=-f/M \quad (b)$$

When the automobile generates the backward repulse braking force of the tire backward friction f, the motion speed of the automobile begins to uniformly decelerate by the braking deceleration of the equation (b). Given that a mutual action and reaction time of f and f' is ΔT, i.e., a braking time, the motion speed of the automobile at a beginning of braking is V, and the motion speed of the automobile at an end of braking is 0, according to another expression of the Newton's second law of motion, namely the law of momentum, it is obtained that $$-f\Delta T=-MV; \text{ and}$$

$$\text{thus } \Delta T=MV/f \quad (c).$$

From the aspect of energy conversion, the braking process of the forward motion inertia force of the automobile is a process of energy conversion and consumption, wherein firstly the kinetic energy of the automobile is converted into heat via working by the forward motion inertial force Fi=f' at the motion displacement and via the mechanical friction of the backward brake; then the heat is absorbed by the brake discs (the brake drum) and the brake pads (the brake shoes), and finally released into the air via the air convection and the thermal radiation. Given a braking distance S and the kinetic energy of the automobile 0.5 MV², according to the energy conservation law, it is obtained that:

$$FiS=0.5MV^2-0; \text{ and}$$

$$\text{thus } S=0.5MV^2/f'=0.5MV^2/f \quad (d).$$

Through the equations (b), (c) and (d), the deceleration, the braking distance and the braking time when the braking force F of the conventional backward brake is constant can be respectively calculated, whereas the frictions f and f' between the tire and the road surface are restricted by the maximum fmax.

When the braking force F<fmax, between the tire and the road surface, merely the backward rolling friction adhesive force f which is variable with the braking force F is generated. When F=fmax in the emergency braking, under a condition that a slip rate between the tire and the road surface is not large, the backward friction f of the tire can reach the maximum fmax, so the automobile is able to safely and stably obtain a minimal braking distance S=0.5 MV²/fmax and a minimal braking time ΔT=MV/fmax when the tire is braking under a critical state between rotating and locking up. When F>fmax in the emergency braking, the wheel is locked up by an over-large backward braking moment of the backward brake, and thus a longitudinal dynamic friction fd is generated between the tire and the road surface. Since fd<fmax, the braking performance of the automobile decreases; the braking distance and the braking time grow. Moreover, besides the longitudinal dynamic friction, a lateral friction adhesive force of the tire is greatly diminished. As a result, the automobile is quite liable to run astray or drift, and tends to cause serious accidents. When the wheel is locked up by the backward brake, the backward brake is completely disenabled to convert the kinetic energy into the heat via the sliding friction. The energy conversion is completely accomplished by an intense sliding friction generating heat between the tire and the road surface, so that the tire made of synthetic rubber has a sharp temperature increase and a serious damage. Correspondingly, the tire would age and run out of service life in advance, and be more susceptible to a potential flat tire.

Since a maximum of the backward braking force F of the conventional backward brake is restricted by the maximum adhesive force fmax between the tire and the road surface, it is necessary to strictly control the backward braking force F of the backward brake each time the automobile brakes, for preventing the automobile from the serious and dangerous locking-up. That is exactly the purpose that the conventional ABS aims for as the widely applied electronic safety brake control technique. Main working principles and application design methods of the conventional ABS electronic safety brake control technique are further illustrated as follows.

Figure 6:
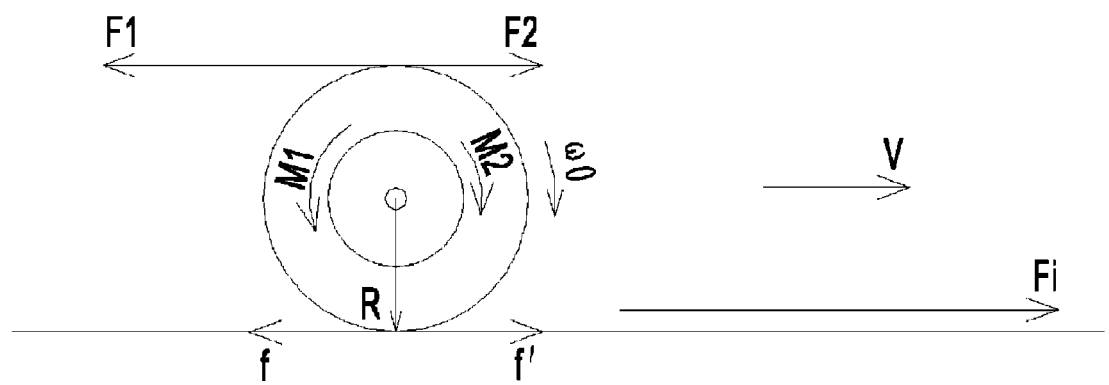
FIG. 6 is a sketch view illustrating principles of brake mechanics, tire frictional stress analysis and physical motion process of a dual-directions braking method according to the preferred embodiment of the present invention.

Referring to FIG. 6, principles of brake mechanics, tire brake frictional stress analysis and physical motion process of the dual-directions braking method of the present invention are as follows.

The following analysis and illustration is particularly important for understanding the dual-directions braking method of the present invention as the first barrier. The dual-directions braking method can be truly understood and accepted only based on an in-depth comprehension about the Newton's third law of motion, and an essentially correct knowledge about a generation mechanism of the braking friction between the tire and the road surface and the automobile principles of brake mechanics, after figuring out dual-directions moment relations between the dual-directions braking mechanism of the present invention and the tire.

Similar to the conventional backward braking method, the dual-directions braking method and the dual-directions braking mechanism of the present invention operate based on the mutual friction between the tire and the road surface. Nevertheless, different from the conventional backward barking method, the dual-directions braking mechanism is induced by the dual-directions braking method of the present invention to generate braking friction between the tire and the road surface. Through the wheel moments, on a periphery surface of the tire, the dual-directions braking mechanism generates a backward braking moment $M1=F1\times R$ in a direction opposite to a wheel rotation direction, and simultaneously generates a forward braking moment $M2=F2\times R$ in a direction the same as the wheel rotation direction. A mutual action of M1 and M2 generates that $M1=2\times M2$ and $F1=2\times F2$. The backward and the forward braking moments M1 and M2 are a core mechanics thought of the dual-directions braking method of the present invention, and a soul of the braking mechanics of the present invention. Acting simultaneously by the backward braking moment and the forward braking moment, M1 and M2, renders the dual-directions braking method of the present incredible in the braking. However, when braking effect parameters of the present invention are put forward for the first time, ones with some common sense in physics would reject or ignore without a second thought, since the above content seems to be contradictory to the restriction of the classic friction calculation formula $f=N\times$ in the conventional braking technology theories and the common laws recognized in the industry for the recent hundreds of years.

The wheel action moment is an alegbraic quantity and the action force of the action moment is a vector, so the dual-directions braking mechanism of the present invention operates to generate the braking moment which can be equivalently calculated via an alegbraic sum of M1 and M2. Supposing that the forward braking moment in the same direction with the rotation direction of the wheel is positive, the braking moment on the wheels generated by the dual-directions braking mechanism equivalently is $(-M1)+M2=-M2=-F2\times R$, namely a common action result of M1 and M2, in such a manner that the braking moment generated by the tire of the wheel is still equivalent to a backward braking moment of $F2\times R$.

When the dual-directions braking mechanism of the present invention operates with the equivalent backward braking moment of $F2\times R$, the tire as a force applying member exerts a forward friction f' in a motion direction of the automobile on the road surface as a force receiving member. According to the Newton's third law of motion (action and reaction law), the road surface certainly exerts on the tire a reaction force f equal to and opposite to f'. In other words, the road surface exerts the backward friction f on the tire, f=f'. Herein, because a moment $f\times R$ of the backward friction f generated by the road surface on the tire is also backward, during the operation of the dual-directions braking mechanism of the present invention, according to principles of a tire moment equilibrium, if the tire is able to keep rotating, given a maximum of f=f' is fmax, a moment equilibrium equation of the tire $f\times R=F2\times R$ and a following equation must be simultaneously established.

$$f'=f=F2=0.5F1 \leq fmax \quad (a')$$

In the above illustrations, the tire comprising the automobile body and the braking mechanism is taken as an automobile motion inertial reference frame, and the road surface (the earth) is taken as an automobile motion reference frame. F2 and F1 are both the braking forces on the tires generated by the braking moments of the dual-directions braking mechanism in the automobile motion inertial reference frame. More specifically speaking, the equivalent braking force F1 and F2 on a periphery surface of the tire are both generated by motion inertia (or inertial force) within the automobile motion inertial reference frame, while f' and f are respectively the mutual friction between the tire (the automobile motion inertial reference frame) and the road surface (the automobile motion reference frame).

Under the backward braking moment $F1\times R$ on the tire in the automobile motion inertial reference frame, the tire (force applying member) applies a forward action force of F1 relative to the road surface (the automobile motion reference frame). The forward action force is a first forward motion inertial force which is actually generated by the automobile in the motion direction (Fi'=F1=2f'). According to the Newton's third law of motion, the road surface (force receiving member) generates a backward reaction force (F1=2f) relatively to the action force of the tire μl. The backward reaction force is a first backward repulse braking force (F1=2f) which is actually generated by the automobile in a direction opposite to the motion direction. Moreover, under the forward braking moment $F2\times R$ in the automobile motion inertial reference frame, the tire applies a backward action force of F2 relative to the road surface. The backward action force is a second backward repulse braking force (F2=f) which is also actually generated by the automobile in the direction opposite to the motion direction. According to the Newton's third law of motion, the road surface generates a forward reaction force (F2=f') relative to the backward action force F2 of the tire. The forward reaction force is a second forward motion inertial force (Fi''=F2=f') which is also actually generated by the automobile in the motion direction.

During the action and reaction process of the mutual friction between the tire (the automobile motion inertial reference frame) and the road surface (the automobile motion reference frame), a result of simultaneous and mutual balance between the forward action force F1=2f' and the backward action force F2=f of the tire relative to the road surface is merely indicated between the road surface (the automobile motion reference frame) and the tire (the automobile motion inertial reference frame) as the forward friction f' of the tire on the road surface in FIG. 6, wherein f'=F1−F2. Moreover, a result of simultaneous and mutual balance between the backward reaction force of the forward action force F1=2f and the forward reaction force of the backward action force F2=f of the road surface relative to the tire is merely indicated between the road surface (the automobile motion reference frame) and the tire (the automobile motion inertial reference frame) as the backward friction f of the road surface on the tire, wherein f=F1−F2. The aforementioned analysis and inference about the balance of the friction between the tire and the road surface is another core mechanics concept of the present invention.

As a conclusion, only under the mutual friction of f' and f between the tire (the automobile motion inertial reference frame) and the road surface (the automobile motion reference frame), the actual backward repulse braking forces generated by the automobile (the motion inertial reference frame) in the motion direction totals 2f+f=3f; the actual forward inertial forces generated by the automobile (the motion inertial reference frame) in the motion direction totals Fi=Fi'+Fi''=3f'.

From the angle of energy conversion, a braking generation process of the forward motion inertial force of the dual-directions braking method of the present invention is a process of energy conversion and consumption, wherein firstly kinetic energy of the automobile is converted into heat via working by the forward motion inertial force Fi=3f' at the motion displacement and via the mechanical translationally rotating friction of the dual-directions braking mechanism; then the heat is absorbed by the two friction discs, the friction disc ring and the friction pads of the brake calipers, and finally released into the air via the air convection and the thermal radiation.

Herein, supposing that a braking time of the automobile is still ΔT, a motion velocity when the automobile starts to brake is still V, the motion velocity when the automobile finishes braking is 0, the automobile has a weight of M and a braking deceleration of a, according to Newton's second law of motion (two kinds of expressions), following equations are obtained.

$$a = -3f/M \quad (b')$$

$$-3f\Delta T = -MV$$

Thus, $\Delta T = MV/3f$ \quad (c').

Supposing that a braking distance of the automobile is still S, according to the energy conservation law, $$Fi\ S = 0.5MV^2 - 0.$$

Thus, $S = 0.5M\ V^2/3f$ \quad (d').

Through the three equations (b'), (c') and (d'), the deceleration, the braking distance and the braking time when the braking forces F1=2×F2 of the dual-directions braking method are constant can be respectively calculated, whereas the frictions f' and f between the tire and the road surface are also restricted by the maximum fmax.

In the above analysis, the equation (a') is an expected dual-directions braking performance condition for obtaining ideal dual-directions braking performance by the dual-directions braking method of the present invention. When the expected dual-directions braking performance condition is unsatisfied, i.e., F1<2×F2 or F1>2×F2, the dual-directions braking mechanism of the dual-directions braking method of the present invention is unable to obtain the ideal dual-directions braking performance. However, compared to the conventional backward braking method, even if the expected dual-directions braking performance condition is not satisfied completely, the dual-directions braking method of the present invention is still able to generate excellent dual-directions braking as long as a difference between F1 and 2×F2 is not too large.

In combination with a conventional standardized passive seat belt, the present invention with the greatly improved dual-directions braking performance is able to protect human bodies. However, an intense braking forward impulse inertial force of the present invention may damage and affect organs of the human bodies and a body structure of the automobile. Thus a feasibility and necessity of an application of the present invention can be comprehensively evaluated and proved, according to scientific data about a maximal security and limit braking deceleration tolerable for normal seated gestures of the human bodies in the exercise physiology and designed strength parameters of the body structure of the automobile.

Compared with the conventional backward braking method, the dual-directions braking method of the present invention avoids increasing the braking friction load on the tire caused by the greatly improved dual-directions braking performance, due to the equal braking frictions between the tire and the road surface in the dual-directions braking method.

During braking with 0.5×F1=F2<fmax, the backward friction adhesive force f which varies with the braking forces F1=2×F2 is generated between the tire and the road surface, but the braking distance of the automobile is S=0.5 MV²/3f and the braking time is ΔT=MV/3f. In an emergency braking with F2=fmax, under a condition that a slip rate between the tire and the road surface is not large, the maximal backward friction adhesive force fmax can be generated between the tire and the road surface, so the automobile is able to safely and stably obtain a minimal braking distance S=0.5 MV²/3fmax and a minimal braking time ΔT=MV/3fmax when the tire is braking under a critical state between rotating and locking up. In an emergency braking with 0.5×F1=F2>fmax, the wheel is locked up by the dual-directions braking mechanism; the dual-directions braking mechanism stops the translationally rotating friction; similarly to the automobile with the conventional backward braking method, the automobile with the dual-directions braking method is potentially endangered.

Because the dual-directions of the present invention is also restricted by the maximal friction adhesive force fmax between the tire and the road surface, it is necessary to strictly control a maximal braking force 0.5×F1=2×F2 each time the dual-directions braking mechanism operates, so as to prevent the serious and dangerous locking. In the preferred embodiment of the present invention, a DABS of a dual-directions braking system is provided as an electronic safety brake control technology aiming to control the maximal braking force of the dual-directions braking mechanism 0.5×F1=2×F2 and adapt well to ABS/EBD of the conventional automobile backward braking method.

Based on the above comparison and analysis, important conclusions are listed as follows.

Compared to the conventional backward brake of the conventional backward braking method, the dual-directions braking method and the dual-directions braking mechanism, provided by the present invention, improve the braking effect twice, shorten the braking distance and the braking time by two thirds, and improve the brake deceleration twice, while keeping the braking friction load between the tire and the road surface unchanged, so as to greatly improve the automobile traffic safety and reduce the traffic accident rate.

The principles of brake mechanics are totally identical, so the above comparison, analysis and conclusions can be similarly applied for braking by trains on railway and braking by loading/taking-off aircrafts on runway, which is omitted without repeated illustration herein.

Since the trains, the automobile and the aircrafts emerged, no one has ever put forward the dual-direction braking method, mainly because of a universal difficulty in concepts and systematical analysis methods in front of such highly complicated and abstract mechanics puzzle, and also because of greatly lacking a correct knowledge about an essence of the brake mechanics of the various wheeled motor transportation vehicles like trains, especially making wrong judgment about force applying and receiving relations between the tire and the road surface or common fatal conceptual misunderstanding during analyzing the tire brake friction mechanics and physical motion process with the Newton's third law of motion. It is absolutely not accidental for all the humans to make the above mistake, but, objectively speaking, quite inevitable. Even the inventor of the present invention once repeatedly pondered and struggled for a long time because of the deep and intense impact from conventional thinking set and habits.

The dual-directions braking method of the present invention, although taking advantage of the friction between the tire and the road surface in the same manner with the conventional automobile backward braking method, differs from the conventional automobile backward braking mechanism in the principles of brake mechanics of the braking mechanism. Therefore, under scientific knowledge and inspiration of the inventor, the braking method of the present invention is named as the dual-directions braking method; the forward moment of the braking mechanism of the present invention is named as the forward braking moment against common sense, and the action force thereof is named as the forward braking force, so as to highlight importance and contribution thereof in the dual-directions braking method of the present invention.

According to the preferred embodiment of the present invention, referring to FIGS. 1, 2, 7, 8 and 9, the working principles and the main design methods of the dual-directions braking mechanism are illustrated as follows.

Figure 7:
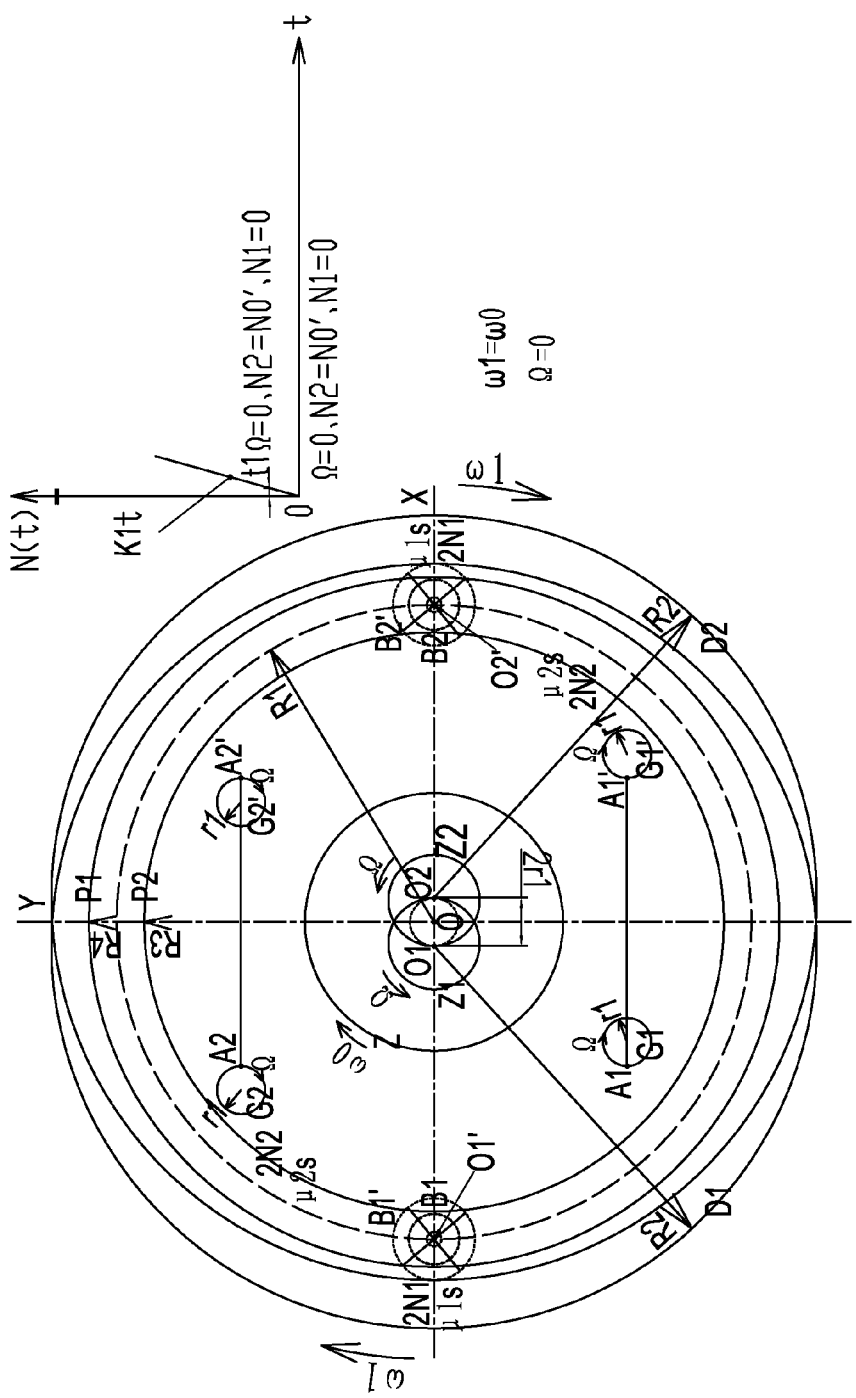
FIG. 7 is a sketch view of the dual-directions braking mechanism at a non-operational recovery state according to the preferred embodiment of the present invention.
Figure 8:
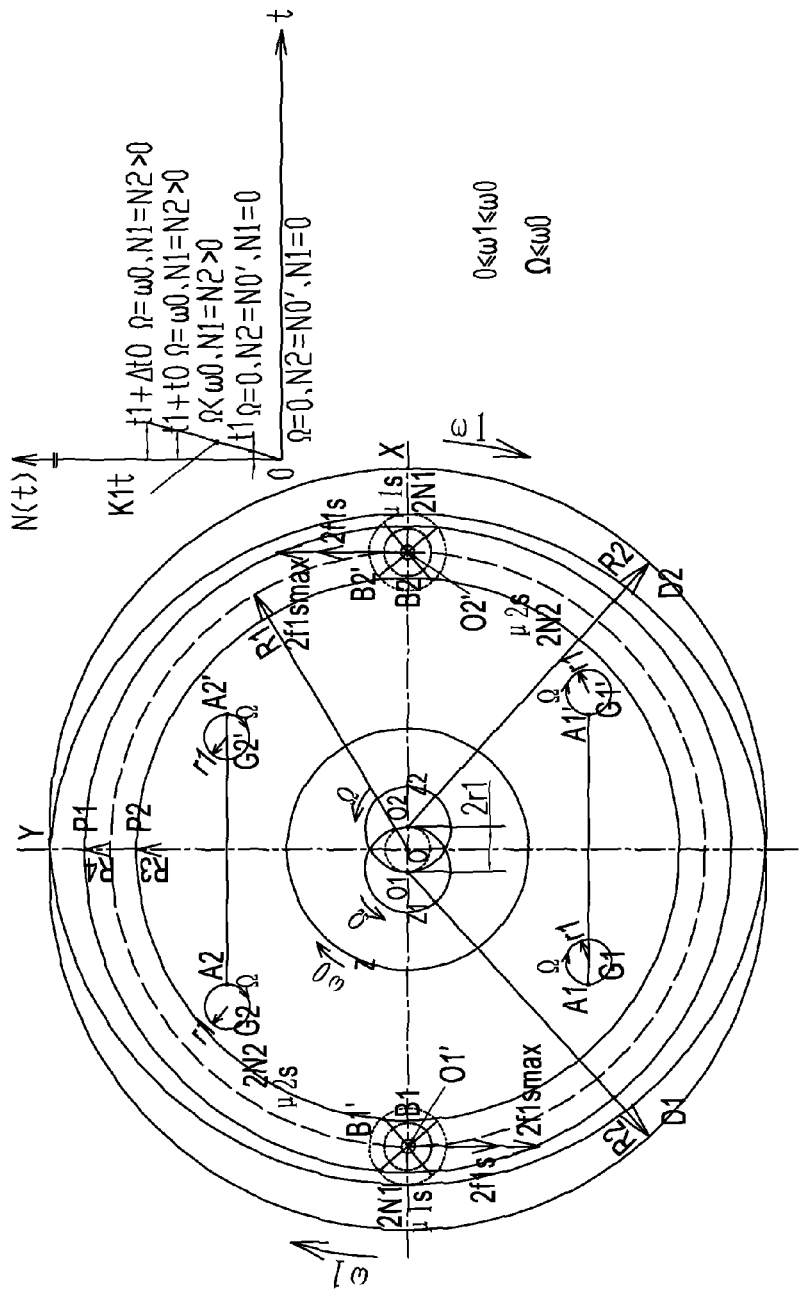
FIG. 8 is a sketch view of a translationally rotating friction instant impulse process when the dual-directions braking mechanism starts to operate according to the preferred embodiment of the present invention.
Figure 9:
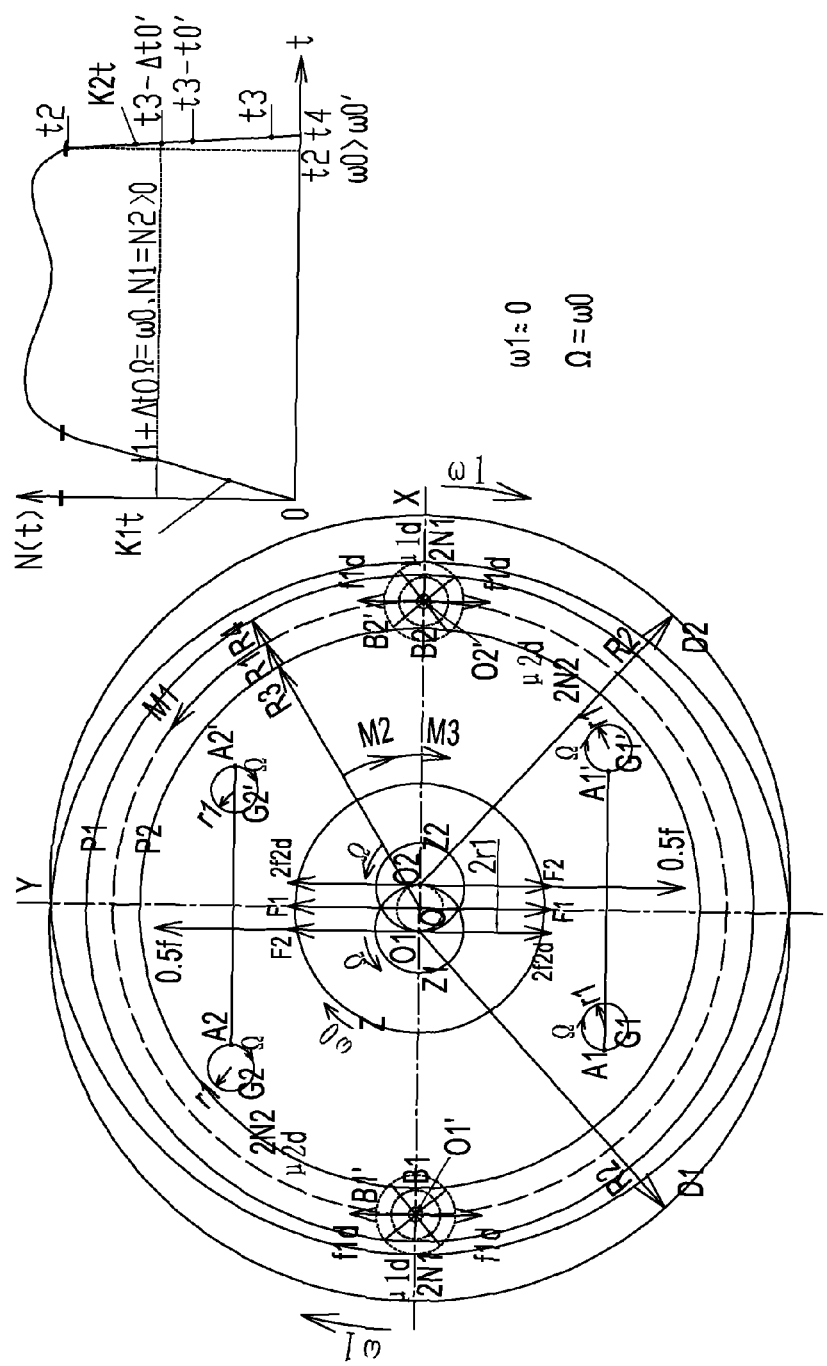
FIG. 9 is a sketch view of a translationally rotating friction stable operation process of the dual-directions braking mechanism according to the preferred embodiment of the present invention.

(1) Uniform Hypotheses of Working Principles and Main Design Method of Dual-Directions Braking Mechanism of the Present Invention FIGS. 7, 8 and 9 respectively show a non-operational recovery state, a translationally rotating friction instant impulse process when the dual-directions braking mechanism starts to operate, and a translationally rotating friction stable operation process of the dual-directions braking mechanism of the present invention as showed in FIGS. 1 and 2, as well as corresponding operation pressure illustrative waveforms of the hydraulic wheel cylinder of the brake calipers. For a convenience of systematic analysis and illustration, key geometric size, geometric position relationships, design parameters and physical quantities of main operation parts in FIGS. 1 and 2 are necessarily and uniformly hypothesized as follows, wherein letters representing related physical vectors only indicate values of the vectors.

OX and OY: respectively horizontal and vertical reference plane coordinate axes passing through point O;

the point O is an axial vertical plane projection of the axis of the main sections of the crankshaft, and also an axial vertical projection of a rotation axis of the friction disc ring; points O1 and O2 are axial vertical plane projections of the two axes of the two eccentric sections which are disposed at 180° on the crankshaft;

points O1' and O2' are respectively axial vertical plane projections of centers of the friction operation surfaces of the friction pad pairs of the two pairs of brake calipers, or axial vertical plane projections of equivalent friction action points of the translationally rotating friction between the friction pad pairs of the two pairs of brake calipers and the two friction discs;

two circles where D1 and D2 are located and internal round surfaces thereof are respectively axial vertical plane projections of the two friction discs, which are marked together as D1-D2; two smaller circles where Z1 and Z2 are located and internal round surfaces thereof are respectively axial vertical plane projections of the two eccentric sections of the crankshaft; a circle where Z is located and an internal round surface thereof is an axial vertical plane projection of the wheel mounting flange on the first main section at the outer end of the crankshaft;

R2 is a radius of two round surfaces of the two friction discs; r41 is a vertical distance between the axis of the main section and the two axes of the two eccentric sections of the crankshaft, defined as a radius of the eccentric section;

two circles where P1 and P2 are located and internal round surfaces thereof are axial vertical plane projections of the operation surfaces of the cylindrical-ring-shaped friction rings at the two sides of the friction disc ring, which are marked together as P1-P2; R3 and R4 are respectively rotation radiuses of an inner cylindrical surface and an outer cylindrical surface of the cylindrical-ring-shaped friction ring at the two sides of friction disc ring;

two small circles where B1' and B2' are located and internal round surfaces are respectively projections of piston bodies of the hydraulic wheel cylinder on the two pairs of brake calipers on a plane vertical to the axis of the main sections of the crankshaft, or illustrative overlapped projections of the friction pad pairs of the two pairs of brake calipers, wherein the projections of the piston bodies of the hydraulic wheel cylinder on the two pairs of brake calipers are marked together as B1'-B2'; and wherein the illustrative overlapped projections of the friction pad pairs of the two pairs of brake calipers are marked together as B1-B2; pattern ⊙ represents an axial pressure applying direction from inside to outside of a first friction pad of each pair of brake calipers, and pattern ⊕ represents an axial pressure applying direction from outside to inside of a second friction pad of the pair of brake calipers, so as to represent synchronously opposite pressure applying effect on the friction pad pair of the pair of brake calipers; R1 is a vertical distance from the center of the operation surface of the friction pad pair of the pair of brake calipers to the axis of the main sections of the crankshaft;

ω0 is an angular velocity of a rotation of the main sections of the crankshaft, as well as rotations of the wheel and the wheel mounting flange; ω1 is an angular velocity of synchronously revolving by the two friction discs and the friction disc ring with the axis of the main sections in the revolving direction;

Ω is a synchronous rotating angular velocity in the direction opposite to the revolving direction of the two friction discs relatively to the axis of the main sections, and a synchronous rotating angular velocity in the direction opposite to the revolving direction of the friction disc ring relatively to the axis of the main sections;

two small circles where G1 and G1' are located are axial vertical plane projections of circular tracks of two arbitrary symmetrical mass points A1 and A1' on the two sides of the friction disc D1 in the synchronous translationally rotating friction stable operation process, the two mass points A1 and A1' rotating clockwise at the radius of r1 and the angular velocity of Ω; two small circles where G2 and G2' are located are axial vertical plane projections of circular tracks of two arbitrary symmetrical mass points A2 and A2' on the inner surface and the outer surface of the friction disc D2 in the synchronous translationally rotating friction stable operation process, the two mass points A2 and A2' rotating clockwise at the radius of r1 and the angular velocity of Ωλ; two connected lines A1A1' and A2A2' are both parallel with a connected line O1O2;

N1 and N2 are respectively normal pressures on the outer surfaces of the two friction discs and on the friction disc ring by the operation surfaces of the friction pad pairs of the two pairs of brake calipers, N1=N2; N(t) is a time function of an operation pressure of the piston of the hydraulic wheel cylinder of each pair of brake calipers, namely N1(t)=N2(t)=N(t);

N0' is a structural normal clipping pressure between the inner surfaces of the two friction discs and the symmetrical friction rings at the two sides of the friction disc ring, for generating a static friction to prevent the friction disc ring from non-operational rotation;

μ1d and μ1s are respectively a dynamic friction coefficient and a static friction coefficient between the operation surfaces of the friction pad pairs of the two pairs of brake calipers and the outer surfaces of the two friction discs; μ2d and μ2s are respectively a dynamic friction coefficient and a static friction coefficient between the inner surfaces of the two friction discs and the operation surfaces of the friction disc ring; and μ2d=μ1d;

f1s is a static friction generated on the radius R1 in the synchronous translationally rotating friction instant impulse process between the operation surfaces of the friction pad pairs of the two pairs of brake calipers and the outer surfaces of the two friction discs; a maximal f1s is f1smax; a time function of f1s varying with the operation pressure N1(t) is f1s(t); f1d is a dynamic friction generated on the radius R1 in the synchronous translationally rotating friction stable operation process between the operation surfaces of the friction pad pairs of the two pairs of brake calipers and the outer surfaces of the two friction discs; a time function of f1d varying with the operation pressure N1(t) is f1d(t); F1 is an action force generated by the friction disc ring on the main section in the synchronous translationally rotating friction stable operation process among the operation surfaces of the friction pad pairs of the two pairs of brake calipers, the outer surfaces of the two friction discs, and the operation surfaces of the symmetrical friction rings at the two sides of the friction disc ring; F1=2×N2(t)×μ2d, wherein action directions of f1d and F1 are perpendicular to the connected line O1O2 and vary with a rotation of the points O1 and O2;

f2d is a dynamic friction generated on the radius of the eccentric section r1 in the synchronous translationally rotating friction stable operation process between the inner surfaces of the two friction discs and the operation surfaces of the symmetrical friction rings at the two sides of the friction disc ring, as one of the backward braking forces; F2 is an action force generated on the radius of the eccentric section r1 in the synchronous translationally rotating friction stable operation process between the inner surfaces of the two friction discs and the operation surfaces of the symmetrical friction rings at the two sides of the friction disc ring, as the forward braking force; and F2=F1=2×f2d=2×N2(t)×μ2d, wherein action directions of f2d and F2 are perpendicular to the connected line O1O2 and vary with the rotation of the points O1 and O2;

f is an action force on the radius r1, applied by the backward friction on the tire by the road surface, through moments of the tire and the main section; an action direction of f is perpendicular to the connected line O1O2 and varies with the rotation of the points O1 and O2;

M1 is a backward braking moment simultaneously generated by the inner friction pairs and the outer friction pairs on the main sections in the translationally rotating friction stable operation process of the dual-directions braking mechanism; M2 is a forward braking moment simultaneously generated by the inner friction pairs and the outer friction pairs on the main sections in the translationally rotating friction stable operation process of the dual-directions braking mechanism; M1=2×M2, which is the expected operation condition for the dual-directions braking mechanism to obtain the expected dual-directions braking performance, accomplished by designs about the six parameters r1, R1, R2, R3, R4, μ1d and μ2d; M3 is an action moment on the dual-directions braking mechanism, applied by the backward friction of the tire, through the moments of the tire and main sections;

Q1 is an angular momentum generated by the two friction discs (comprising the first rolling bearings) around the axis of the main sections of the crankshaft; Q2 is an angular momentum generated by the friction disc ring around the axis of the main sections of the crankshaft; time functions of Q1 and Q2 are respectively Q1(t) and Q2(t);

ρ1 is a density of the metal friction material of the two friction discs; H1 is an axial column height of the two friction discs; and ρ2 is a density of the steel matrix strength metal material of the friction disc ring; H2 is an axial column height of the steel matrix strength metal material of the friction disc ring; ρ2' is a density of the friction material of the symmetrical cylindrical-ring-shaped friction rings at the two sides of the friction disc ring; H2' is an axial column height of the friction material the symmetrical cylindrical-ring-shaped friction ring at each side of the friction disc ring.

Based on the above uniform hypotheses, the working principles and the main analysis and design methods of the dual-directions braking mechanism of the present invention are respectively illustrated as follows.

(2) Analysis about Working Principles of Dual-Directions Braking Mechanism of the Present Invention An operation of the dual-directions braking mechanism of the present invention mainly comprises the following three continual stages each time the automobile is running forward.

Stage 1: a translationally rotating friction instant impulse process, which is inherent when the dual-directions braking mechanism starts to operate; which is also an inherent instant transitional process, beginning with simultaneously contacting by two friction pad pairs of two pairs of brake calipers with outer surfaces of two friction discs to generate friction, and ending at entering a translationally rotating friction stable operation process by the two friction discs; during which minor braking effect is generated;

Stage 2: the translationally rotating friction stable operation process, during which a backward braking moment of the dual-directions braking mechanism is twice of a forward braking moment simultaneous generated thereby, in such a manner that the dual-directions braking mechanism obtains an ideal dual-directions braking effect; and Stage 3: a translationally rotating friction instant impulse process, which is inherent when the dual-directions braking mechanism finishes operating; which is also an inherent instant transitional process, beginning with rapidly decreasing operation pressures between the two friction pad pairs of the two pairs of brake calipers and the outer surfaces of the two friction discs, and ending at totally separating operation surfaces of the friction pad pairs with the outer surfaces of the two friction discs; wherein the friction pad pairs of the two pairs of brake calipers synchronously and actively return to non-operational recovery states after the stage 3.

An operation of the dual-directions braking mechanism of the present invention mainly each time the automobile is running backward also comprises the above three stages. Compared to running forward, the automobile runs backward less frequently and usually at low speeds, which requires less braking strength. Thus, the automobile safe braking matters more when the automobile is running forward than running backward.

When the automobile is holding, an operation of the dual-directions braking mechanism excludes the translationally rotating friction instant impulse processes of the stages 1 and 3, because none translationally rotating friction exists between the friction pad pairs of the two pairs of brake calipers and the outer surfaces of the two friction discs; the dual-directions braking mechanism only generates dual-directions braking static friction.

Referring to FIG. 7, when the dual-directions braking mechanism is at the non-operational recovery state, the hydraulic wheel cylinders B1'-B2' of the two pairs of brake calipers only have small pre-stored pressures; the operation surfaces of the friction pad pairs B1-B2 of the two pairs of brake calipers and the two friction discs D1-D2 are at the non-operational recovery state as showed in FIG. 2, without any mutual rotation or friction, which is further defined as a time of 0. At time 0, the operation pressures $N1(0)=0$ and $N2(0)=N0'$. Therefore, the two friction discs D1-D2, the points O1 and O2, and the two small circles Z1 and Z2 all together rotate clockwise around the point O, i.e., the axis of the main sections, at the angular velocity $\omega 0=\omega 1$ with the rotating angular velocity $\Omega=0$, instead of rotating counter-clockwise respectively around the point O1 and the point O2, i.e., the two axes of the two eccentric sections. Herein, the two arbitrary symmetrical mass points A1/A1' on the inner surface and the outer surface of the friction disc D1, and the two arbitrary symmetrical mass points A2/A2' on the inner surface and the outer surface of the friction disc D2, all together rotate clockwise around the point O, i.e., the axis of the main sections, at the angular velocity $\omega 1=\omega 0$ with the two friction discs D1-D2.

Under the static friction generated by the structural normal clipping pressure N0', the friction disc ring P1-P2 and the two friction discs D1-D2 together synchronously rotate with the main sections, which is the same as brake pads of the conventional disc brake, instead of applying braking moment on the main sections.

Referring to FIGS. 7 and 8, when the dual-directions mechanism starts to operate, firstly the hydraulic wheel cylinders B1'-B2' of the two pairs of brake calipers synchronously and timely generate a "rising slope wave pressure" N(t) with a fixed slope K1, as an inducing action pressure each time the dual-directions braking mechanism starts to operate.

When the "rising slope wave pressure" N(t) increases, a time when the operation surfaces of the friction pad pairs B1-B2 of the two pairs of brake calipers just contact the outer surfaces of the two friction discs D1-D2 is defined as a time t1, and then $N1(t1)=0$; before and at the time t1, the two friction discs D1-D2 and the friction disc ring P1-P2 still rotate clockwise together around the point O, i.e., the axis of the main sections, at the angular velocity $\omega 1=\omega 0$, which is the same as being at the non-operational recovery state.

From the time t1, under the continually increasing "rising slope wave pressure" N(t), the operation pressures between the operation surfaces of the friction pad pairs B1-B2 of the two pairs of brake calipers and the two friction discs D1-D2 synchronously increase from $N1(t1)=0$. Correspondingly, mutual friction emerges between the operation surfaces of the friction pad pairs B1-B2 of the two pairs of brake calipers and the two friction discs D1-D2, in such a manner that the two friction discs D1-D2, the axes of the two eccentric sections Z1 and Z2, and the points O1 and O2 as centers of the two eccentric sections begin to synchronously rotate counter-clockwise respectively around the points O1 and O2 of the two axes of the two eccentric sections at the angular velocity Q2, while keeping synchronously revolving clockwise around the point O of the axis of the main sections at the angular velocity of $\omega 0$. Herein the two friction discs D1-D2 are at a weak translationally rotating state, which decreases a motion linear velocity of all mass points on the two friction discs D1-D2 relatively to the time t1; and rapidly decreases the angular velocity $\omega 1$ of the clockwise rotation by the inner surfaces and the outer surfaces of the two friction discs D1-D2 and the friction rings at the two sides of the friction disc ring P1-P2 around the point O of the axis of the main sections.

Under the continually increasing "rising slope wave pressure" N(t), when the two friction discs D1-D2 synchronously rotate counter-clockwise respectively around the points O1 and O2 of the two axes of the two eccentric sections at the angular velocity Q2 $\omega 0$ at a time of t1+t0, while keeping synchronously revolving clockwise around the point O of the axis of the main sections at the angular velocity $\omega 0$, a relative motion linear velocity of the mutually contacting friction operation surfaces, near the two points O1' and O2', of the outer surfaces of the two friction discs D1-D2 and the operation surfaces of the friction pad pairs B1-B2 of the two pairs of brake calipers turns into tiny or 0 instantly. Because of the static friction f1s and the maximal static friction f2smax between the outer surfaces of the two friction discs D1 and D2 and the operation surfaces of the friction pad pairs B1-B2 of the two pairs of brake calipers, an instant static friction impulse process must be generated synchronously therebetween.

Once a backward impulsive moment generated by the two friction discs D1-D2 during the above instant static friction impulse process is out of effective control, a response time thereof would be over long, which disenables to readily enter the subsequent synchronous translationally rotating friction stable operation process between the inner surfaces and the outer surfaces of the two friction discs D1-D2 and the friction pad pairs B1-B2 of the two pairs of the brake calipers, and between the inner surfaces and the outer surfaces of the two friction discs D1-D2 and the operation surfaces of the friction disc ring P1-P2. Correspondingly, it is also delayed to obtain the ideal dual-directions braking performance. A quantitative analysis about the translationally rotating instant static friction impulse process inherent when the dual-directions braking mechanism starts to operate and finishes operating is further illustrated in detail in the following structural dynamics of the translationally rotating friction instant impulse process, a model of function δ and a calculation method of the rising slope induced by the "rising slope wave pressure" N(t).

Further referring to FIGS. 8 and 9, after the translationally rotating instant static friction impulsive action from t1 to t1+t0, the hydraulic wheel cylinders B1'-B2' of the two pairs of brake calipers readily stops the timely inducing by the "rising slope wave pressure" N(t) with the fixed slope K1 at the time of t1+Δt0, which means the translationally rotating instant static friction impulse process when the dual-directions braking mechanism starts to operate is completely finished. In the meantime, under a common action of the dynamic friction f1d, generated on the radius R1 between the outer surfaces of the two friction discs D1-D2 and the operation surfaces of the friction pad pairs B1-B2 of the two pairs of brake calipers, and the dynamic friction f2d, generated on the radius r1 of each eccentric section between the inner surfaces of the two friction discs D1-D2 and the operation surfaces of the friction rings of the friction disc ring P1-P2, the two friction discs D1-D2 synchronously revolve clockwise around the point O of the axis of the main sections at ω0, while synchronously rotating counter-clockwise respectively around the points O1 and O2 of the axes of the two eccentric sections at Ω≈ω0, which indicates that the dual-directions braking mechanism officially enters the translationally rotating friction stable operation process. During the translationally rotating friction stable operation process, ω1≈0; the linear velocity of a periphery of each surface of the two friction discs D1-D2 is ω0×r1.

It is worth to mention that, during the translationally rotating friction stable operation process, not only the two arbitrary symmetrical mass points A1 and A1' on the inner and the outer surfaces of the friction disc D1 are rotating clockwise synchronously, at the two small circles G1 and G1' with the radius of r1, at Ω≈ω0, but also the connected line A1A1' of the two arbitrary symmetrical mass points on the inner and the outer surfaces of the friction disc D1 is rotating at a translationally rotation state or at a nearly translationally rotation state. In the meantime, not only the two arbitrary symmetrical mass points A2 and A2' on the inner and the outer surfaces of the friction disc D2 are rotating clockwise synchronously, at the two small circles G2 and G2' with the radius of r1, at Ω≈ω0, but also the connected line A2A2' of the two arbitrary symmetrical mass points on the inner and the outer surfaces of the friction disc D2 is rotating at a translationally rotation state or at a nearly translationally rotation state. A manner of the translationally rotating friction motion has important friction motion and mechanics feature, forming a key of an industrialization of the dual-directions braking method of the present invention. The friction motion feature is proved geometrically as follows.

From the time t1+Δt0, through the synchronous stable translationally rotating friction between the inner and outer surfaces of the two friction discs D1-D2 and the two friction pad pairs B1-B2 of the two pairs of brake calipers, and between the inner and outer surfaces of the two friction discs D1-D2 and the operation surfaces of the friction rings of the friction disc ring P1-P2, the backward braking moment M1 in the direction opposite to the rotation direction of the main sections and the forward braking moment M2 in the rotation direction of the main sections are simultaneously generated on the main sections.

Due to the motion and mechanics features of the stable translationally rotating friction, when the two points O1 and O2 of the two axes of the two eccentric sections are located as showed in FIG. 9, between the outer surfaces of the two friction discs D1-D2 and the operation surfaces of the friction pad pairs B1-B2 of the two pairs of brake calipers, the dynamic friction equivalently generated on the radius R1 at the two points O1' and O2' is 4×f1d=4×N1(t)×μ1d; the dynamic friction generated between the inner surfaces of the two friction discs D1-D2 and the symmetrical friction rings at the two sides of the friction disc ring P1-P2 is 4×f2d=4×N2(t)×μ2d. Therefore, the wheel and the main sections, as the force applying member, by simultaneous action on the radius of each eccentric section r1, generates the backward braking moment M1=(4×f1d+4×f2d)×r1 on the main section. In the meantime, the synchronous stable translationally rotating friction between the inner surfaces of the two friction discs D1-D2 and the operation surfaces of the friction rings of the friction disc ring P1-P2, simultaneously generates the action forces F1 in two directions passing through the point O of the main sections, wherein F1=2×f2d=2×N2(t)×μ2d. The wheel and the main sections, as the force applying member, in two directions passing through the two points O1 and O2, simultaneously generate the action forces F2, namely the forward braking force, wherein F2=F1=2×f2d=2×N2(t)×μ2d. Under simultaneous action of the two actions forces F1 passing through the point O of the main sections and the two actions forces F2 respectively on the radius of each eccentric section r1, the forward braking moment generated on the main sections is M2=2×F2×r1=4× f2d×r1. Since N1(t)=N2(t) and μ1d=μ2d, then F1=2×N1(t)× μ1d=2×N2(t)×ρ2d=F2. As a result, obtained from the above equations of M1 and M2, M1=2×M2.

The above analysis is merely about the forward braking moment and the backward braking moment which are simultaneously generated on the main sections when the two points O1 and O2 of the two axes of the two eccentric sections are located at positions as showed in FIG. 9. In fact, when the two points O1 and O2 rotate to other positions, the action directions of f1d, f2d, F1 and F2 vary with the two points O1 and O2, but maintain perpendicular to the connected line O1OO2, as well as the action direction of the action force f which is applied on the radius r1, through the moments of the wheel and the main sections, by the backward friction on the tire by the road surface. Moreover, the friction disc ring is at an equilibrium of force in a radial direction of the main sections; in other words, no matter what position the two points O1 and O2 rotate to, the dual-directions braking mechanism at the stable translationally rotating friction always maintains the braking moments M1=2×M2. If the braking moment in the rotation direction of the main sections is defined as positive, through the synchronous stable translationally rotating friction of the inner and the outer friction pairs, the algebraic sum of the backward braking moment and the forward braking moment simultaneously generated on the main sections is $-M1+M2=-2\times M2+M2=-M2$. Therefore, in order to maintain the rotation of the wheel and the translationally rotating friction operation of the dual-directions braking mechanism, the mutual friction between the road surface and the tire is only required to generate a forward action moment $M3=f\times r1=M2$.

Referring to the above analysis and the aforementioned illustrations about the dual-directions braking method, from the time $t1+\Delta t0$, by satisfying the equation of $M1=2\times M2$, and synchronously generating the operation pressure variable with the time in an arbitrary waveform by the hydraulic wheel cylinders B1'-B2' of the two pairs of brake calipers $N(t)\geq N(t1+\Delta t0)$, the dual-directions braking mechanism is able to generate the corresponding dual-directions braking effect. Under the same operation conditions, the dual-directions braking mechanism of the present invention generates a maximal dual-directions braking effect three times of a maximal braking effect of the conventional automobile backward brake.

Further referring to FIG. 9, when the dual-directions braking mechanism finishes operating at a time t2, given that the angular velocity $\omega 0$ is lowered down into $\omega 0'$, the two hydraulic wheel cylinders B1' and B2' of the two pairs of brake calipers generate a "falling slope wave pressure" N(t) with a variable falling slope K2 in accordance to different rotation speeds of the main sections, in such a manner that the operation pressures between the operation surfaces of the friction pad pairs B1-B2 of the two pairs of brake calipers and the outer surfaces of the two friction discs D1-D2 decrease rapidly and disappear. When the automobile is stopping, $\omega 0'=0$; the translationally rotating instant static friction impulse process when the dual-directions finishes operating is avoided. When the automobile is decelerating instead of stopping, $\omega 0'<\omega 0$; when the "falling slope wave pressure" N(t) decreases rapidly, between the operation surfaces of the friction pad pairs B1-B2 of the two pairs of brake calipers and the outer surfaces of the two friction discs D1-D2, within $t3-\Delta t0'$, $t3-t0'$ and t3, the translationally rotating instant static friction impulse process, when the dual-directions braking mechanism finishes operating, emerges as a reverse process of the translationally rotating friction instant friction impulse process, when the dual-directions braking mechanism starts to operate, as showed in FIG. 8. Under an action of an impulsive moment generated by the impulse process, when the impulse process is over at the time t3, the two friction discs D1-D2 and the friction disc ring P1-P2 accelerate together instantly from $\omega 1\approx 0$ to $\omega 1\approx \omega 0'$, and then synchronously and circumferentially rotate clockwise around the point O of the axis of the main sections at the angular velocity $\omega 0'$.

Herein, $N1(t3)=0$. The operation surfaces of the friction pad pairs B1'-B2' of the two pairs of brake calipers rapidly and synchronously separate from the outer surfaces of the two friction discs D1-D2; and thereafter, actively and synchronously return to the non-operational recovery state as showed in FIG. 2 at a time t4. Finally, along with a complete finish of the synchronous translationally rotating state between the two friction discs D1-D2 and the friction disc ring P1-P2, a whole of the translationally rotating friction process of the dual-directions braking mechanism of the present invention is finished.

Even if the translationally rotating instant static friction impulse process when the dual-directions finishes operation is not completely over, or the operation surfaces of the friction pad pairs B1'-B2' of the two pairs of brake calipers are synchronously separating from the outer surfaces of the two friction discs D1-D2 while the translational rotation between the two friction discs D1-D2 and the friction disc ring P1-P2 is not completely stopped, the dual-directions braking mechanism is ready for and able to begin next operation any time.

The working principles of the dual-directions braking mechanism when the automobile is running backward are the same as the working principles of the dual-directions braking mechanism when the automobile is running forward, except the opposite rotation directions of the angular velocities, $\omega 1$, $\omega 0$ and $\Omega$, and the opposite directions of the related action forces and the braking moments. Herein, the working principles of the dual-directions braking mechanism when the automobile is running backward are no further illustrated.

(3) Quantitative Analysis about Translationally Rotating Friction Instant Impulse Process and Main Illustration about Control Method Thereof of Dual-Directions Braking Mechanism of the Present Invention According to the preferred embodiment of the present invention, based on the above qualitative analysis about the translationally rotating friction instant impulse process in the aforementioned working principles of the dual-directions braking mechanism, a dynamics quantitative analysis of the dual-directions braking mechanism mainly takes advantage of modeling the function $\delta$, and aims to provide a safe, reliable, economical and feasible control method of the translationally rotating instant static friction impulse process when the dual-directions braking mechanism starts to operate and finishes operating, for effectively controlling a response time of the impulse process.

Further referring to FIG. 8, the two friction discs D1-D2 (comprising the first rolling bearings) and the friction disc ring P1-P2 have certain weights. During the translationally rotating instant static friction impulse process within a time interval of $t1-t1+\Delta t0$, under the mutual friction between the operation surfaces of the friction pad pairs B1-B2 of the two pairs of brake calipers and the outer surfaces of the two friction discs D1-D2, the two friction discs D1-D2 and the friction disc ring P1-P2 are able to synchronously rotate together around the point O of the axis of the main sections at the angular velocity $\omega 0$ only by generating the backward impulsive moment on the two friction discs D1-D2 and the friction disc ring P1-P2 to generate correspondingly equal momentum moment decrement. Correspondingly, the two friction discs D1-D2 and the friction disc ring P1-P2 readily enter the translationally rotating frictions stable operation process which comprises synchronously revolving clockwise around the point O of the axis of the main sections at the angular velocity $\omega 0$ and meanwhile respectively rotating counter-clockwise around the points O1 and O2 of the axes of the two eccentric sections at the angular velocity $\Omega\approx\omega 0$.

As mentioned in the above analysis, under the inducing action of the "rising slope wave pressure" with the fixed slope K1, during the translationally rotating instant static friction impulse process around the point O of the axis of the main sections at the initial angular velocity $\omega 0$ by the two friction discs D1-D2 and the friction disc ring P1-P2, the instant static friction impulsive action on the outer surfaces of the two friction discs D1 and D2 by the operation surfaces of the friction pad pairs B1-B2 of the two pairs of brake calipers simultaneously exerts a certain value of the backward impulsive moment on the two friction discs D1 and D2 and the friction disc ring P1-P2. Herein, an accumulative action value of the backward impulsive moment is defined as Cf1.

In order to facilitate calculation, analysis and illustration, the time t1 is supposed to be a start point, point O', of the translationally rotating friction instant impulse process. A time interval of t1–t1+t0–t1+Δt0 can be abbreviated as a time interval of 0'–t0–Δt0. According to the uniform hypotheses and the qualitative analysis, sine the four outer friction pairs of the dual-directions braking mechanism operate simultaneously, the time function of the instant static friction impulsive action force equivalently generated at the radius R1 onto the outer surfaces of the two friction discs D1-D2 by the operation surfaces of the friction pad pairs B1-B2 of the two pairs of brake calipers is $4f1s(t)=4N1(t)\mu 1s$, wherein $N1(t)=N(t)$ is the operation pressure generated by inducing action of the "rising slope wave pressure" $N(t)$ with the fixed slope K1 when the dual-directions braking mechanism starts to operate. Within the time interval of 0'–t0–Δt0, at $t=0', f1s(0')=N1(0')\times\mu 1s=0$, because $N(0')=NO$ and $N1(0')=0$;

at $t=t0, f1s(t0)=f1smax(t0)=N1(t0)\times\mu 1s$.

A calculation of the accumulative action value of the backward impulsive moment, Cf1, by modeling the function δ mainly involves the following four features of the function δ.

Feature 1 (selectivity) $\int f1s(t)\times\delta(t-t0)dt=f1s(t0)$ (integral interval of $-\infty-+\infty$)
Feature 2 $f1s(t)\times\delta(t-t0)=f1s(t0)\times\delta(t-t0)$
Feature 3 $(t-t0)\delta(t-t0)=0$
Feature 4 (symmetry/even function) $\delta(t-t0)=\delta(t0-t)$ Note: the symbol "$\int$" represent a mathematic symbol of integration; the integral interval is $(-\infty-+\infty)$.

Within the time interval of $(-\infty-+\infty)$, the feature 1 of the function δ obtains an equation that:

$$\int 4\times f1s(t)\times\delta(t-t0)dt=4\times f1s(t0)=4\times N1(t0)\times\mu 1s \quad (1).$$

From the equation (1), within the time interval of 0'–Δt0, the maximal static friction impulsive action force $4\times f1smax(t0)$ simultaneously on the outer surfaces of the two friction discs D1-D2 by the operation surfaces of the friction pad pairs B1-B2 of the two pairs of brake calipers, mathematically speaking, is calculated with an integral of the function $\delta(t-t0)$ interfered with $f1s(t)$ within the time interval of $(-\infty-+\infty)$ as $4\times f1smax(t0)=4\times N1(t0)\times\mu 1s$. Physically speaking, $4\times f1smax(t0)$ can be selected out during the instant static friction impulse process generated within the time interval of 0'–Δt0 to be exerted between the frictional operation surfaces.

From the feature 2 of the function δ, both sides of the equation $f1s(t)\times\delta(t-t0)=f1s(t0)\times\delta(t-t0)$ are firstly multiplied by a time continuous function $\Psi(t)=t/t0$, wherein t0 is a time value of t0 within the time interval of 0'–Δt0, and then calculated for an integral about a time variable t at the interval of $(-\infty-+\infty)$, namely the following integral equation $$\int\Psi(t)\times f1s(t)\times\delta(t-t0)dt=\int\Psi(t)\times f1s(t0)\times\delta(t-t0)dt; \text{ and}$$

substituted with $\Psi(t)=t/t0$, the above integral equation transforms into:

$$\int(t/t0)\times f1s(t)\times\delta(t-t0)dt=\int(t/t0)\times f1s(t0)\times\delta(t-t0)dt \quad (2).$$

By transforming a right side of the above equation (2), and substituting with the feature 3 of the function δ of $(t-t0)\delta(t-t0)=0$, it is obtained as follows.

$$\int (t/t0)\times f1s(t0)\times\delta(t-t0)dt = f1s(t0)/t0\int t\delta(t-t0)dt \quad (3)$$

$$= f1s(t0)/t0\int[(t-t0)+t0]\delta(t-t0)dt$$

$$= f1s(t0)/t0\int\left[\begin{array}{c}(t-t0)\delta(t-t0)+\\ t0\delta(t-t0)\end{array}\right]dt$$

$$= f1s(t0)/t0)t0\int\delta(t-t0)dt$$

According to a definition of the function δ, because $\delta(t-t0)=0$ when $t\neq t0$, it is unnecessary for an integration of a left side of an equation $\int\delta(t-t0)dt=1$ to be over the time interval of $(-\infty-+\infty)$; the integration of the left side of the equation $\int\delta(t-t0)dt=1$ is required to be merely over a very tiny time interval between a and b, comprising the time t0, namely:

$\int\delta(t-t0)dt=1$ (the integral interval is a-b, when a<t0<b); and $\int\delta(t-t0)dt=0$ (the integral interval is a-b, when a>t0 and t0>b), wherein a and b are tiny values of time.

According to the definition of the function δ, the integration of the equation (3) at the time interval of $(-\infty-+\infty)$ chosen to be over the time interval of 0'–Δt0 comprising the time t0 obtains an integration result, i.e., an integration result of the left side of the equation (2) as:

$$\int(t/t0)\times f1s(t)\times\delta(t-t0)dt=[f1s(t0)/t0]\times t0 \quad (4); \text{ and}$$

the integration of the equation (3) at the time interval of $(-\infty-+\infty)$ chosen to be over the time interval of 0'–Δt0 excluding the time t0 obtains an integration result, i.e., an integration result of the left side of the equation (2) as:

$$\int(t/t0)\times f1s(t)\times\delta(t-t0)dt=0 \quad (5).$$

According the above equations (1), (2), (3), (4) and (5), under the inducing action of the "rising slope wave pressure" $N(t)$ with the fixed slope K1 by the hydraulic wheel cylinders, at the time interval of 0'–Δt0 comprising the time t0, the accumulative action value of the backward impulsive moment Cf1 in the instant static friction impulse process generated simultaneously on the outer surfaces of the two friction discs D1-D2 at the radius R1 by the operation surfaces of the friction pad pairs B1-B2 of the two pairs of brake calipers, namely:

$$Cf1=\int 4\times(t/t0)\times f1s(t)\times\delta(t-t0)dt=4\times K1\times\mu 1s\times R1\times t0 \quad (6); \text{ and}$$

at the time interval of 0'–Δt0 excluding the time t0, under the inducing action of the "rising slope wave pressure" $N(t)$ with the fixed slope K1 by the hydraulic wheel cylinders, the accumulative action value of the backward impulsive moment Cf1 in the instant static friction impulse process generated simultaneously on the outer surfaces of the two friction discs D1-D2 by the operation surfaces of the friction pad pairs B1-B2 of the two pairs of brake calipers, Cf1=0.

Within the time interval of 0'–Δt0, the accumulative action value of the backward impulsive moment Cf1 in the translationally rotating instant static friction impulse process is exerted simultaneously on the whole instant translationally rotation process of the two friction discs D1-D2 and the friction disc ring P1-P2 which have the certain weights, namely inertia moment, so as to generate the correspondingly equal momentum moment decrement. A change in the momentum moment of the two friction discs D1-D2 and the friction disc ring P1-P2 at the time interval of 0'–Δt0 is obtained through the following calculus.

According the aforementioned uniform hypotheses, analysis and illustration, the two friction discs D1-D2 and the friction disc ring P1-P2 are rotating around the point O of the axis of the main sections (circumferentially) at an angular velocity $\omega 1 = \omega 0$ at the time 0'. Herein a differentiation of the momentum moment of the two friction discs D1-D2 is $2(\omega 0 \times r1) \times r1 \times \rho 1 \times (2\pi r \times H1)dr$; a differentiation of the momentum moment of the friction disc ring P1-P2 comprises the differentiation of the steel matrix strength metal material and the differentiation of the cylindrical-ring-shaped friction ring, respectively $(\omega 0 \times r) \times r \times \rho 2 \times (2\pi r \times H2)dr$ and $2(\omega 0 \times r) \times r \times \rho 2' \times (2\pi r \times H2')dr$. The momentum moments of the two friction discs D1-D2 and the friction disc ring P1-P2 at the time 0' (circumferentially) are respectively:

$$Q1(0') = \int 2(\omega 0 \times r) \times r \times \rho 1 \times (2\pi r \times H1)dr =$$
$$3\pi \omega 0 \times \rho 1 \times H1 \times R2^3 \times R2; \text{ and}$$

$$Q2(0') = \int (\omega 0 \times r) \times r \times \rho 2 \times (2\pi r \times H2)dr + \int 2(\omega 0 \times r) \times r \times \rho 2' \times$$
$$(2\pi r \times H2')dr = 1.5\pi \times \omega 0 \left[ \frac{\rho 2 \times H2 \times R4^3 \times R4 + 2 \times \rho 2' \times H2' \times}{(R4^3 \times R4 - R3^3 \times R3)} \right].$$

$Q1(0')$ has r at the integral internal of (0, R2), while the integral of $Q2(0')$ is a difference between the integrals of r respectively at (0, R4) and (0, R3), plus the integral of r at (0, R4). The two friction discs D1-D2 are rotating around the point O of the axis of the main sections (translational rotation) at the time t0, wherein the linear velocity of the periphery of each rotating friction disc is $\omega 0 \times r1$. The friction disc ring P1-P2 is rotating around the point O of the axis of the main sections (translational rotation) at the time 0 at the angular velocity $\omega 1 \approx 0$. A differentiation of the momentum moment of the two friction discs D1-D2 at the time 0' (circumferentially) is $2(\omega 0 \times r1) \times r1 \times \rho 1 (2\pi r \times H1)dr$. Differentiations of the momentum moments of the two friction discs D1-D2 and the friction disc ring P1-P2 at the time t0 (translational rotation) are respectively:

$$Q1(t0) = \int 2(\omega 0 \times r1) \times r1 \times \rho 1 \times (2\pi r \times H1)dr = 2 \times \omega 0 \times \rho 1 \times H1 \times r1^2 \times R2^2; \text{ and}$$

$$Q2(t0) = 0.$$

$Q1(t0)$ has r at the integral internal of (0, R2). Through the above calculus calculation, a total momentum moment of the two friction discs D1-D2 and the friction disc rig P1-P2 at the time 0' (circumferentially) is $Q1(0')+Q2(0')$; a total momentum moment of the two friction discs D1-D2 and the friction disc rig P1-P2 at the time 0 (translational rotation) is $Q1(t0)+Q2(t0)$. In the above calculus calculation of the momentum moment, the momentum moments are obtained containing certain errors, because the first rolling bearings and the through-holes of the two friction discs D1-D2 and the friction disc ring P1-P2 are out of consideration. In order to obtain accurate values of the momentum moments, it is necessary to take the first rolling bearings and the through-holes of the two friction discs D1-D2 and the friction disc ring P1-P2 into consideration, and refer to the above calculus calculation for integrals on different intervals.

According to the accumulative action value of the backward impulsive moment Cf1 obtained by the equation (6), in combination with the theory of angular momentum, $$-4 \times K1 \times \mu 1s \times R1 \times t0 = [Q(t0) + Q2(t0)] - [Q1(0') + Q2(0')] \quad (7).$$

According to the quantitative analysis and the calculus calculation about modeling the function δ for the translationally rotating instant static friction impulse process between the operation surfaces of the friction pad pairs B1-B2 of the two pairs of brake calipers and the two friction discs D1-D2, and referring to the equation (7), as long as the design parameters K1, μ1s, R1, R2, ρ1, H1, R3, R4, ρ2, H2, r1, ρ2' and H2' of the dual-directions braking mechanism are set and known, and the value of the angular velocity $\omega 0$ is known (detected by the wheel speed sensor in real time), the above equation (7) is totally able to obtain the value of the time t0 of the inducing action of the "rising slope wave pressure" N(t) with the fixed slope K1 of the dual-directions braking mechanism. In other words, with respect to the translationally rotating instant static friction impulse process which is inherent each time when the dual-directions braking mechanism starts to operate, not only the response time can be obtained by the above model of the function δ and the above calculus calculation, but also the safe, reliable, economical and feasible control can be accomplished in a combined electronic measurement control manner by detecting the angular velocity $\omega 0$ in real time by the wheel speed sensor and actively timing the inducing action of the "rising slope wave pressure" N(t) via the fixed slope K1. That is also the main reason why the hydraulic wheel cylinders B1'-B2' of the two pairs of brake calipers adopt the "rising slope wave pressure" N(t) with the fixed slope K1 to induce the operation surfaces of the friction pad pairs B1-B2 of the two pairs of brake calipers and the two friction discs D1-D2 to generate the translationally rotating instant static friction impulse process, each time the dual-directions starts to operate.

The time condition of t0<Δt0 is a protection time specially set to ensure that the translationally rotating instant static friction impulse process between the operation surfaces of the friction pad pairs B1-B2 of the two pairs of brake calipers and the two friction discs D1-D2 is finished smoothly on time. Even if the weights of the two friction discs D1-D2 on the two eccentric sections and the friction disc ring P1-P2 and the momentum moment thereof decrease due to a long-time operation and wear, the dual-directions braking mechanism is still able to rapidly enter the ideal translationally rotating friction stable operation process at the expected shortest time via the translationally rotating instant static friction impulsive action, so as to provide the two friction discs D1-D2 with the stable operation condition of $\Omega \approx \omega 0$. As a result, the main sections of the crankshaft are facilitated to generate the backward braking moment M1 and the forward braking moment M2 simultaneously and rapidly; and the equation $M1=2\times M2$ is ensured.

Further referring to FIG. 9, with respect to the translationally rotating instant static friction impulse process at the time interval between t3−Δt0' and t3, which is inherent when the dual-directions braking mechanism finishes operating, an accumulative action value of impulsive moment Cf2, generated on the outer surfaces of the two friction discs D1-D2 by the operation surfaces of the friction pad pairs B1-B2 of the two pairs of brake calipers, and momentum moment increment, correspondingly generated by the two friction discs D1-D2 and the friction disc ring P1-P2, can be analyzed and calculated similarly to the above modeled function δ of the translationally rotating instant static friction impulse process when the dual-directions braking mechanism starts to operate.

Between the operation surfaces of the friction pad pairs B1-B2 of the two pairs of brake calipers and the outer surfaces of the two friction discs D1-D2, an order of contacting and separating of the instant static friction impulsive action when the dual-directions braking mechanism finished operating at the time interval between t3−Δt0' and t3, is exactly opposite to the order of contacting and separating of the translationally rotating instant static friction impulse process when the dual-directions braking mechanism starts to operate at the time interval between t1 and t1+Δt0. Therefore, according to the feature 4 of the function δ (symmetry/even function), the integration of the translationally rotating instant static friction impulse process when the dual-directions finishes operating at the time interval of (+∞−−∞) can be changed into the integration at the time interval of (−∞−+∞). Further referring to the calculus calculation and transformation of the function δ as showed in the equations (1), (2), (3), (4) and (5), the accumulative action value of impulsive moment Cf2 of the instant static friction impulse process, simultaneously generated on the outer surfaces of the two friction discs D1-D2 at the radius R1 by the operation surfaces of the friction pad pairs B1-B2 the two pairs of brake calipers, at the time interval between t3−Δt0' and t3 comprising t3−Δt0', under the inducing action of the "falling slope wave pressure" N(t) with the variable slope K2 which varies with ω0' by the hydraulic wheel cylinders B1'-B2', is calculated as:

$$Cf2=\int(t/t0')\times f1s(t)\times(t0'-t)dt=4\times K2\times \mu 1s \times R1\times t0' \qquad (8); \text{ and}$$

the accumulative action value of impulsive moment Cf2 of the instant static friction impulse process, simultaneously generated on the outer surfaces of the two friction discs D1-D2 by the operation surfaces of the friction pad pairs B1-B2 the two pairs of brake calipers, at the time interval between t3−Δt0' and t3 excluding t3−Δt0', under the inducing action of the "falling slope wave pressure" N(t) generated by the hydraulic wheel cylinders B1'-B2', is calculated as Cf2=0.

According to the equations (6), (7) and (8), the corresponding effective control algorithm is obtained; then based on the value of ω0', the accumulative action value of impulsive moment Cf2 is controlled by controlling the "falling slope wave pressure" N1 (t) with the variable slope K2 as the operation pressure generated between the operation surfaces of the friction pad pairs B1-B2 of the two pairs of brake calipers and the outer surfaces of the two friction discs D1-D2 and controlling the action time t0'. The two friction discs D1-D2 and the friction disc ring P1-P2 are able to accelerate together instantly from ω0≈0 to ω1≈0' due to the accumulation of the impulsive moment Cf2, and then synchronously rotate clockwise circumferentially around the point O of the axis of the main sections at the angular velocity of ω0' when the dual-directions finishes operating, so as to shorten the response time for each time the dual-directions braking mechanism finishes operating.

(4) Brief Illustration about Inducing Slope of "Rising Slope Wave Pressure" of Dual-Directions Braking Mechanism of the Present Invention Based on the above analysis, calculation and illustration, a control algorithm of the "rising slope wave pressure" N(t) with the fixed slope K1 timely generated by the hydraulic wheel cylinders of the dual-directions braking mechanism is taken as an example as follows.

Step 1: Calculating a maximal wheel rotation velocity ω0max From the designed automobile maximal driving speed V (Km/h) and a diameter of the tire D (m), the maximal wheel rotation velocity ω0max (rpm) is:

$$\omega 0max=1000V/(60D) \qquad (9).$$

Step 2: Determining values of the fixed slope K1 of the "rising slope wave pressure" N(t), the maximal inducing action t0max, t1 and Δt0 of the dual-directions braking mechanism, corresponding to ω0max The response time of the dual-directions braking mechanism required by the automobile is set to be the time value of t1+Δt0; the protection time Δt0−t0 of the instant static friction impulse process is determined reasonably. Given the known design parameters μ1s, R1, R2, ρ1, H1, R3, R4, ρ2, H2 and r1 of the dual-directions braking mechanism, according to the equation (7) and ω0=ω0max, supposing that t0 is t0max, the following simultaneous equations about the unknown numbers K1 and t0max are obtained.

$$-4\times K1\times \mu 1s\times R1\times t0max=[Q1(t0)+Q2(t0)]-[Q1(0')+Q2(0')]$$

$$t0max=(t1+\Delta t0)-(\Delta t0-t0) \qquad (10)$$

In the above simultaneous equations (10), the values of t1+Δt0 and Δt0-t0 can be known, so the design values of the fixed slope K1 of the "rising slope wave pressure" N(t) and t0max, corresponding to the maximal wheel rotation velocity ω0max, are calculated, as well as the time values of t1 and Δt0, by solving the above simultaneous equations.

Step 3: Determining a calculation and control method of the time for the inducing action, [t1+Δt0]|ω0, by the "rising slope wave pressure" N(t) with the fixed slope K1 at an arbitrary angular velocity ω0

When the dual-directions braking mechanism starts to operate, based on the value of the angular velocity ω0 which is detected by the wheel speed sensor in real time, the time is controlled as the following equation (11).

$$[t1+\Delta t0]|\omega 0=t1-t0max(\omega 0max-\omega 0)/\omega 0max+\Delta t0 \qquad (11)$$

By controlling the hydraulic wheel cylinders of the brake calipers to generate the "rising slope wave pressure" N(t) with the fixed slope K1, the dual-directions braking mechanism is able to rapidly finish the translationally rotating friction instant impulse process when the dual-directions starts to operate within the expected and effectively controlled time of t1+Δt0. A calculation and corresponding control method of the "falling slope wave pressure" N(t) with the variable slope K2 when the dual-directions braking mechanism finishes operating can be executed with reference to the "rising slope wave pressure" N(t), without further illustration herein.

It is one of the core design targets of the present invention to effectively control the translationally rotating friction instant impulse process which is inherent when the dual-directions braking mechanism starts to operate and finishes operating. Modeling the function δ is the mathematic sole of the present invention.

Figure 10:
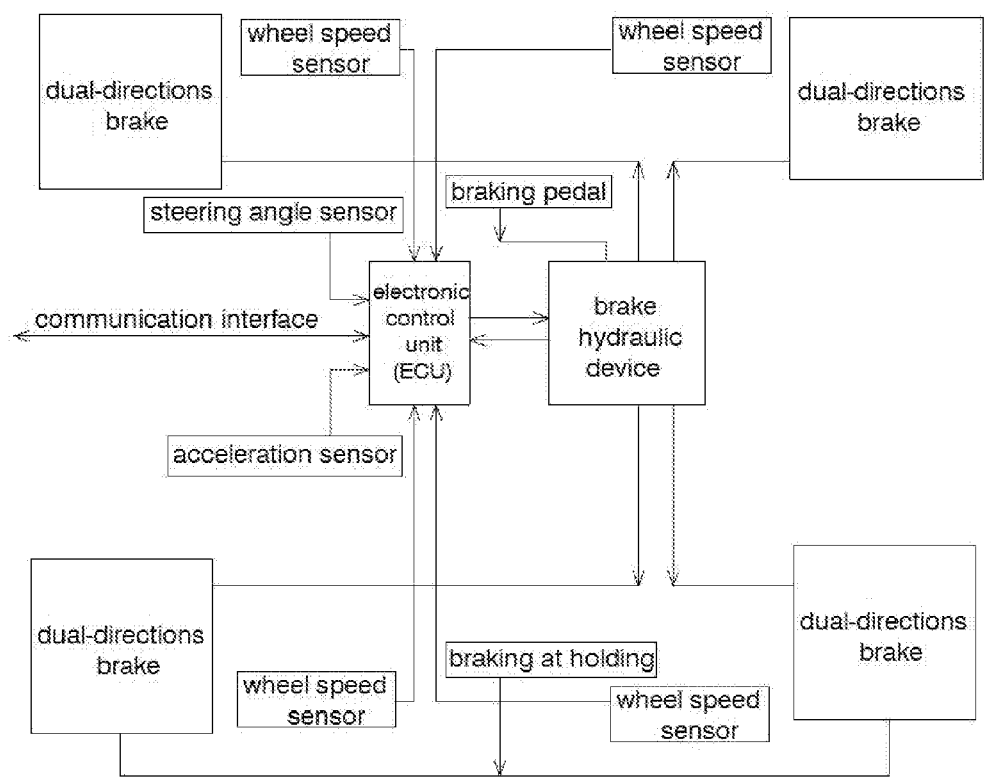
FIG. 10 is a block diagram of a dual-directions braking system (DBS) based on the dual-directions braking mechanism according to the preferred embodiment of the present invention.

(5) Brief Illustration about Main Components, Principles, Functions and Design Methods of Dual-Directions Braking System of the Present Invention Referring to FIG. 10, for the braking mechanism of the dual-directions braking method of the disc brake of the present invention, in order to obtain the expected dual-directions braking performance and adapt to the electronic safety control technologies, comprising the three standardized application technologies of ABS, EBD and ESP, a dual-directions braking system of the present invention is provided. The dual-directions braking system comprises: four of the dual-directions braking mechanisms which are respectively provided within four wheel hubs, four wheel speed sensors which are respectively provided for four wheels; an electronic control unit comprising a microprocessor, a steering angle sensor, a yaw-rate sensor, a lateral acceleration sensor and a mechanical electronic brake pedal;

a brake hydraulic device which is controlled by the electronic control unit to generate "slope wave pressure" with variable rising and falling pressure slopes, for supplying the hydraulic wheel cylinder of each pair of brake calipers on each braking mechanism with operation pressure, wherein the brake hydraulic device comprises hydraulic adjustment elements comprising a plurality of pressure-limiting valves and proportional valves based on a brake hydraulic controller technology of conventionally advanced and mature ESP; a plurality of electronic detection input interfaces, provided in the electronic control unit, respectively and correspondingly provided for each wheel speed sensor, the steering angle sensor, the yaw-rate sensor, the lateral acceleration sensor and the mechanical electronic brake pedal; a plurality of electronic control output interfaces correspondingly provided for the brake hydraulic device; and a standard communication bus interface, for satisfying requirements of various real-time input detection, output and communication control of the dual-directions braking system.

When the dual-directions braking system operates at an automobile driving state, firstly the electronic control unit detects out an operation voltage signal of the mechanical electronic brake pedal through the electronic detection input interface; based on the instant wheel speed detected in real time by each of the wheel speed sensors and the corresponding electronic detection input interfaces, the electronic control unit actively controls the brake hydraulic device to synchronously generate the "rising slope wave pressure" for the hydraulic wheel cylinder on each dual-directions braking mechanism, so as to induce and control a response time and an impulse intensity of the translationally rotating friction instant impulse process when the dual-directions braking mechanism starts to operate, so that each dual-directions braking mechanism is able to synchronously and rapidly enter the translationally rotating friction stable operation process. Once each of the four dual-directions braking mechanism synchronously finishes the translationally rotating friction instant impulse process and enters the translationally rotating friction stable operation process, through the electronic control output interfaces, the electronic control unit actively adjusts the pressure-limiting valve and the proportional valve in the brake hydraulic device, and readily stops inducing by the "rising slope wave pressure"; in the meantime, the brake hydraulic device is controlled by the electronic control unit to readily and synchronously generate the operation pressures of arbitrary waveforms for each dual-directions braking mechanism, wherein the operation pressures change in real time with an operation stroke of the mechanical electronic brake pedal, so as to increase, decrease or maintain the operation pressures for each dual-directions braking mechanism. Accordingly, each dual-directions braking mechanism generates the corresponding backward and forward braking moments and the dual-directions braking effect during the translationally rotating friction stable operation process, until the operation voltage signal of the mechanical electronic brake pedal is canceled. When the electronic control unit detects via the electronic detection input interfaces that the operation voltage signal of the mechanical electronic brake pedal is canceled, the electronic control unit controls the brake hydraulic device through the electronic output control interfaces based on the instant wheel speed detected in real time by each of the wheel speed sensors and the corresponding electronic detection input interfaces. The brake hydraulic device is controlled by the electronic control unit to generate the "falling slope wave pressure" whose slope is proportional to the instant wheel speed, in such a manner that each dual-directions braking mechanism rapidly finishes the translationally rotating friction instant impulse process, which is inherent when the braking mechanism finishes operating, and synchronously and actively returns to the non-operational recovery state.

When each dual-directions braking mechanism in the dual-directions braking system is in the synchronous translationally rotating friction stable operation process, based on a series of real-time active detection, computing, judgment and control which comprises the real-time detection by each wheel speed sensor on the wheels, the real-time computing and judgment about each tire slip rate on a road surface, and the dual-directions braking moments on each dual-directions braking mechanism, the electronic control unit controls a DABS and a DEBD of each wheel, so as to avoid a sliding friction in an emergency braking due to surpassing a maximal friction adhesive force of each tire on the road surface and an uneven distribution of dual-directions braking force on each tire. Otherwise, the automobile would encounter steering failure, run astray or drift. The dual-directions braking system of the present invention improves safety and reliability of the automobile.

When the dual-directions braking system operates at the automobile driving state, if the electronic control unit actively detects out an oversteer or an understeer of front wheels, via the real-time detections by the wheel speed sensors, the steering angle sensor, the yaw-rate sensor, the lateral acceleration sensor and the corresponding electronic detection input interfaces, and real-time high-speed computing and analysis about driving stability of the automobile, upon a precursor of unstable driving, the electronic control unit actively controls the operation pressures from the brake hydraulic device required for the translationally rotating friction instant impulse process, which is inherent when each dual-direction braking mechanism starts to operate, and for the translationally rotating friction stable operation process, takes advantage of the dual-directions braking performance in a wide dynamic range of each dual-directions braking mechanism on a basis of an active control of the DABS and the DEBD, and combines the real-time active control method for the dual-directions braking moments by each dual-directions braking mechanism with a wheel driving torque control method of a TCS or an ASR system which is accomplished by real-time communications with a conventional automobile engine management system via the standard communication bus interface, so as to readily rectify driving attitudes in real time, such as the steering failure, the running astray and the drifting. Therefore, the dual-directions electronic stability program DESP has a function of the active safety control, so as to further improve the safety and stability of the automobile driving.

Based on the effective control over the translationally rotating friction instant impulse process of the dual-directions braking mechanism of the present invention, the dual-directions system DBS of the present invention comprises the following two levels of safety brake applications: the safety brake application of the dual-directions anti-lock braking system (DABS) and the dual-directions electric brake force distribution (DEBD); the active safety brake application of the dual-directions electronic stability program (DESP), based on the DABS and the DEBD.

A four-wheel car and a light bus are taken as examples for illustrating the dual-directions braking system with the electronic safety control functions of DABS, DEBD and DESP.

The dual-directions braking system DBS of the present invention is an automobile electronic safety braking control application innovation based on the dual-directions braking method and the braking mechanism thereof of the present invention.

However, the conventional backward braking system is an automobile electronic safety braking control application prior art based on the automobile conventional backward braking method and the conventional disc/drum brake. Although the dual-directions braking system of the present invention essentially differs from the conventional backward braking system in the braking method and the braking mechanism, the dual-directions braking system of the present invention is able to form good technical adaptation to the conventional backward braking system, except inducing the control by generating the "slope wave pressure". The good technical adaptation mainly comprises the following adaptations.

Adaptation 1 With respect to systematic components, the dual-directions braking system DBS of the present invention mainly comprises the wheel dual-directions brakes, the brake hydraulic devices and the electronic controllers. The dual-directions braking system of the present invention has basic functions of braking at the automobile driving state, at the temporarily stopping state, in emergency and at the automobile holding state. The dual-directions braking system of the present invention has advantages of the short braking distance, a good stability in the braking direction and little tire wear.

The brake hydraulic devices are mainly for: increasing, reducing and maintaining the operational hydraulic pressure which is supplied by the hydraulic wheel cylinders of the dual-directions braking mechanism. Besides, in order to accomplish the control over the translationally rotating friction impulse process of the dual-directions braking mechanism, the brake hydraulic devices are further for inducing and controlling the "slope wave pressure".

The conventional backward braking system mainly comprises the conventional disc/drum brake, the brake hydraulic devices and the electronic controllers. The conventional backward braking system is required to satisfy demands in the same way as the dual-directions braking system DBS of the present invention is required, but greatly differs in the braking performance parameters.

Adaptation 2 An application design requirement and a control realization method of the three electronic safety brake control functions, DABS, DEBD and DESP, in the dual-directions braking system DBS, are identical to the following three standardized application design electronic safety control technologies of the conventional backward braking system.

(1) ABS Anti-Lock Brake System Control Function

The ABS is short for Anti-Lock Brake System. In the emergency braking, the locked-up tires always result in the sliding friction between the tires and the road surface, so as to elongate the braking distance. Moreover, if the front wheels with a steering function are locked up and sliding on the road surface, the front wheels would be disenabled to steer due to a reduced adhesive force of the front wheels on the road surface, and then an automobile head is liable to run astray; if the rear wheels are locked up and sliding on the road surface, the lateral adhesive force of the rear wheels on the road surface decreases, and then an automobile tail is liable to drift. Running stray and drifting emerged on the emergency braking are both quite liable to cause major traffic accidents. Especially on bad road surfaces, such as on a water-logging road, on a snow-piled road or on a sand stone road, the automobile in the emergency braking is more endangered. Therefore, the conventional backward braking system is widely equipped with the ABS control technique. By actively controls the braking force of the backward braking system and the pulse cycle control manner of "locking-loosening-relocking-reloosening", the ABS prevents the wheels from locking up, in such a manner that the wheels are always at a critical friction adhesion state to being locked up during the process of braking. Thus, the automobile obtains the maximal friction adhesive braking force between the tires and the road surface, and shortens the braking distance and the braking time.

(2) EBD Electric Brake Force Distribution Control Function

The EBD is short for Electric Brake force Distribution. The EBD is one of the conventional automobile safety electronic control techniques, especially designed to solve the problems of running astray and drifting which are common in the automobile braking. The automobile is liable to run astray or drift when the automobile braking system is operating, because the left tires and the right tires undergo different contact conditions with the road surface. For example, one side of tires are running on wet road surface, and the other side of tires are running on dry road surface; when the automobile is braking, the left tires and the right tires obtain different adhesive force, and thus the automobile tends to skid or even turn on a single side. The EBD has the following working principles. At an instant of braking, the microprocessor of the conventional backward braking control system finishes a real-time rotation velocity detection of each wheel by the four wheel speed sensors, rapidly calculates out values of the adhesive force of each wheel in a wheel speed slip rate algorithm, and then controls the braking device in real time to adjust according to a set control program, wherein the braking force of each wheel brake is matched with the tire adhesive force (traction) to ensure the safety and stability in braking the running automobile. In the emergency braking, once the wheel is locked up, the EBD has balanced the frictional braking force of each tire on the road surface before the ABS begins to operate, so as to prevent the automobile from running astray and drifting, and shorten the braking distance. Therefore, the EBD can be defined as an auxiliary function of the ABS and is able to further improve the braking performance of the ABS.

(3) ESP Electronic Stability Program Active Safety Control Function

The ESP is short for Electronic Stability Program. The ESP is for firmly supporting the ABS or the TCS to better utilize the control effect thereof. The ESP mainly comprises a detection control module; and correspondingly, an electronic detection control communication interface, a wheel speed sensor, a steering angle sensor, a yaw-rate sensor and a lateral acceleration sensor. The ESP has the following working principles. With the real-time detection of each sensor, the ESP detection control module obtains data about the automobile driving state; the microprocessor of the detection control module calculates and analyzes the data at a high speed, and continuously sends rectification control instructions containing rectification control parameters into the ABS and the ASR, or the TCS, through the control communication interface; finally, the ABS and the ASR, or the TCS, actively exert a corresponding braking force or driving force on each wheel brake according to the rectification control instructions, in such a manner that the automobile is kept at the best driving stability in various conditions by controlling the frictional adhesive force between the tires and the road surface. In some extreme cases, the ABS and the ASR, or the TCS, are able to brake more than a hundred times per second. Under an oversteer or an understeer of the front wheels, a control effect over the driving stability is more prominent. The ESP mainly has three application types. The first type is a four-channel four-wheel system for exerting braking force respectively onto four wheel brakes. The second type is a three-channel system for exerting braking force respectively onto two steering front wheels and simultaneously on two rear wheel brakes. The third type is a two-channel system for exerting braking force respectively onto two steering front wheels. With respect to the active safety control performance, the more channels and wheels under the respective control, the more reasonable control algorithm, and the better control effect over the automobile motion stability. Therefore, in contrast with a passive safety control reaction in a manual braking process of the conventional backward braking system by the ABS, the most important quality of the ESP is the safety control automation, so the ESP is able to actively accomplish prevention without manual manipulation.

The three standardized electronic safety control applications of the conventional backward braking system have already been the practical mature technologies in massive production, and have been optimized and proved through a long-time application in the aspect of the real-time process control of the conventional backward braking system mechanics states. The dual-directions braking system DBS of the present invention has the above good technical adaptation to the conventional backward braking system and the conventional electronic safety control application technologies. Thus, based on the conventional backward braking system and the three electronic safety control application technologies, an application design of the dual-directions braking system DBS of the present invention comprises following steps.

Firstly, replacing a conventional disc/drum brake in a conventional backward braking system with a dual-directions brake of the present invention; adding a functional design of inducing and controlling by a "slope wave pressure" as a translationally rotating friction instant impulse process and its control method of the present invention, into the conventional backward braking system; and finally, in an integrated control design manner, correspondingly and necessarily modifying, optimizing and adjusting a software control logic, parameters and a detection control algorithm of a microprocessor in an electronic controller or a control module, so as to accomplish all the electronic safety control functions of the dual-directions braking system DBS of the present invention.

An advanced four-channel four-wheel mechanical electronic braking pedal braking hydraulic control can be accomplished via a proper braking hydraulic project design. For example, the microprocessor (MCU) of the electronic controller can be embodied as a 16-bit embedded microprocessor (XC164) and a highly integrated digital control integrated chip, special for a four-channel PWM electromagnetic valve closed loop, of Germany Infineon Technologies; or be embodied as an advanced integrated chip supporting the ESP control. The above integrated chip has standardized and flexible digitization and excellent electromagnetic compatibility and anti-interference performance; the above integrated chip is able to safely and reliably operate under terrible vehicle environment.

The dual-directions brake of the present invention greatly improves the automobile braking performance along the automobile driving direction, and correspondingly improves anti-sideskid ability of the tires. Therefore, the dual-directions braking system DBS based on the dual-directions brake of the present invention is able to greatly enhance the driving safety and stability compared to the conventional backward braking system and the electronic safety control technique thereof, no matter in the braking distance and the braking time or in the performance of the DABS, the DEBD and the DESP electronic safety control.

According to the above brief illustration, the dual-directions braking system DBS of the present invention is able to adapt to and cover all standardized application designs of the conventional backward braking system and the three electronic safety control technologies. With a powerful comprehensive strength in personnel, technology, fund, research, development and experimental test, it is not too difficult for the automobile industry to accomplish all the application design and industrialization of the dual-directions braking mechanism and system of the present invention.

Compared to the automobile safety brake application technologies, a wheel braking applications situation of the aircrafts during landing or taking off on runway is similar in the aspect of braking the tires made of synthetic rubber, but differs in that the aircraft has a huge weight, a big load upon the wheel and a high sliding speed on the runway. Although the train wheels are made of steel and the corresponding road surface is a steel railway, which leads to a small adhesive friction coefficient (around 0.25) between the train and the railway, the trains share the same braking mechanics principles of the friction between the wheels and the road surface with the automobile and the aircrafts. The disc brake or the drum brake of the automobile is substantially the same as the brakes of the aircraft and the train, but slightly different in some special structure. Compared to complicated and volatile actual traffic of the automobile, the train and the aircraft respectively have the special and closed steel railway and runway; moreover, the automobile wheels and the aircraft wheels respectively undergo relatively stable actual friction adhesion with the steel railway and the runway. Therefore, the train and the aircraft usually adopt the electronic safety braking control application technology and function which are much simpler or have respective emphasis in contrast with the automobile. The three standardized electronic safety control application technologies of the present invention have already covered all electronic safety control function and demand related to the train braking and the aircraft braking.

An application of the dual-directions braking method and the dual-directions braking mechanism of the present invention, for the train braking on the railway and the landing/taking-off aircraft braking on the runway, can be accomplished with reference to the specific application method and the related technical design and analysis of the above automobile dual-directions braking mechanism, without further illustration herein.

As a conclusion, the present invention breaks through a bound of the hundreds of years of the conventional backward braking technical theory of the various wheeled motor transportation vehicles, and is able to greatly improve the safety braking performance. The present invention not only has the significant scientific reasoning and founding, but also has the significant rectification over the knowledge of the braking friction between the wheels and the road surface against the conventional backward braking technology. The present invention indeed belongs to a significant technical breakthrough in a basic research field of brake mechanics application of the safety brake and the active safety control technology of the various wheeled motor transportation vehicles, which lays a foundation for initiating a new "DBT modern dual-directions braking technical theory". Therefore, the present invention is bound to push forward the innovation and development in the safety brake and electronic active safety control application technologies of the worldwide three major transportation vehicles—the automobile, the train and the landing/taking-off aircraft, as great good news for the human traffic safety.

The present invention has a high invention originality, theoretical completeness and remarkable dual-directions braking performance incomparable for the conventional backward braking technology. With respect to manufacture and systematic application of the corresponding technical product, the present invention provides thorough design thoughts and good adaptations to the conventional tire application technology and the standardized electronic safety braking control application technology, and has feasibility in scaled industrialization. Therefore, it is believed that it is completely possible for the manufacturers to upgrade the conventional active safety braking control application technology and product, to capture a huge market and to win great economic and social benefits, by adopting the preferred embodiments of the present invention and accomplishing the corresponding technical industrialization which comprises design optimization, test manufacture, reliability test, art perfection, small-scale production and large-scale production. The brake and safety control of the train on the railway and the aircraft wheel landing/taking-off can be similarly processed with the significant industrialization research and promotion.

The significance and value of the present invention should be comprehensively appreciated based on humanity, history and philosophy in combination with multidisciplinary knowledge, wherein a puzzle and barrier from the humanity is the most complicated and subtle.

A man has only one life. There is not so many memorable moments left for the man by the colorful and gorgeous world. Upon the finish of the present invention, the inventor would like to express sincere thanks to every one who once nurtured, protected, taught, helped or impacted to the inventor, as well as the ones who deeply impressed the inventor. In the meantime, wish the present invention bring peace and happiness to the human and the world.

DEFINITIONS OF EXPRESSIONS OF THE PRESENT INVENTION

Crankshaft, main section, eccentric section and radius of eccentric section—The crankshaft is a crankshaft, for a wheel shaft, having three concentric sections and two eccentric sections, wherein the two eccentric sections are mutually disposed at 180° between each neighboring two of the three concentric sections. The three concentric sections are defined as the main section. The two eccentric sections are defined as the eccentric sections. A vertical distance between each axis of the two eccentric sections and an axis of the three concentric sections is defined as the radius of the eccentric section.

Friction disc ring and friction ring—At two sides of a friction operation round disc having a central vertical line at a surface of the round disc as a rotation axis, a pair of symmetrical friction cylindrical rings are provided around the rotation axis. The friction operation round disc is defined as the friction disc ring; the symmetrical friction cylindrical rings at the two sides are defined as the friction rings. The friction disc ring is provided between the two friction rings. The operation surface of the friction disc ring is a ring-shaped surface of each friction ring.

Friction disc, inner surface, outer surface—Two friction operation discs which are totally identical and respectively provided on the two eccentric sections of the crankshaft are defined as friction round discs, or friction discs. Axes of the two friction discs are central vertical lines of round surfaces of the two friction discs; the surfaces at two sides of the friction disc are operation surfaces of the friction disc. The surfaces of the two friction discs which contact with the friction disc ring for frictional operation are defined as inner surfaces. The rest surfaces of the two friction discs are defined as outer surfaces.

Brake calipers, friction pad, friction pad pair—Various brake calipers, which are applied in the dual-directions braking mechanism of the present invention, and structurally identical or similar to the brake calipers of the conventional disc brake, are defined as brake calipers. Friction operation parts on the brake calipers are defined as friction pads. The friction pads are provided in pairs, which is defined as a friction pad pair.

Outer friction pair and inner friction pair—The outer surfaces contact and rub with the friction pads of the brake calipers, so as to form outer friction pairs. The inner surfaces contact and rub with the friction rings at the two sides of the friction disc ring, so as to form inner friction pairs.

Caliper mounting frame—A rigid mounting frame, fixedly connected to or integrated with an sleeve around rolling bearings of the wheel shaft, for mounting the brake calipers to a body of an automobile, is defined as a caliper mounting frame.

Revolution, rotation and translationally rotating friction—A rotation of the friction discs around an axis of the main sections of the crankshaft is defined as a revolution; in the meantime, reversed rotations of the friction discs around two axes of the two eccentric sections of the crankshaft is defined as a rotation. When the revolution and the rotation of the friction discs have equal or approximate instant angular velocities, because a motion track of any mass point on the friction disc is always a circumference having the same or the similar radius with the revolution by the axis of the friction disc around the axis of the main sections of the crankshaft, and because a connected line of two arbitrary mass points on the friction disc is always at a translationally or substantially translationally rotating state, a relative friction motion manner generated between the friction discs, simultaneously in the revolution and the rotation, and the operation surfaces of the friction pads of the brake calipers, and between the friction discs and the operation surfaces of the friction disc ring, is defined as a translationally rotating friction.

Wheel mounting flange—A connecting flange, mounted to the main section at an outer end of the crankshaft, for mounting wheels, is defined as a wheel mounting flange.

Backward braking moment, backward brake, backward braking method—Braking moments of a braking mechanism of the conventional wheeled motor transportation vehicles, in a direction opposite to a wheel rotation direction, are defined as backward braking moments. All of the conventional disc brakes and drum brakes merely having the backward braking moments are uniformly defined as backward brakes. A braking method of the backward braking moments which the brakes merely have is defined as a backward braking method, or a single-direction braking method, or a backward braking technique.

Dual-directions braking method, forward braking moment, dual-directions braking moments and dual-directions brake—A braking method of the present invention has a prominent technical feature that two braking moments of a braking mechanism of the present invention respectively in a wheel rotation direction and in a direction opposite to the wheel rotation direction are simultaneously generated, so the braking method of the present invention is defined as a dual-direction braking method, or a dual-direction braking technology. The English expression Dual-directions Braking Technology is abbreviated as DBT. The braking moments in the wheel rotation direction are defined as forward braking moments. The braking moments in the direction opposite to the wheel rotation direction and simultaneous generated with the forward braking moments are defined as backward braking moments. The forward braking moments and the backward braking moments are uniformly defined as dual-directions braking moments. The braking mechanism in the braking method of the present invention, simultaneously having the forward and the backward braking moments, is defined as a dual-directions braking mechanism, or a dual-directions brake.

DABS dual-directions anti-lock braking system— In an automobile dual-directions braking system comprising the dual-directions braking mechanism of the present invention, an automobile electronic safety brake control system for preventing the wheels from locking up or skidding when braking is defined as a dual-directions anti-lock braking system. The English expression Dual-directions Anti-lock Braking System is abbreviated as DABS.

DEBD dual-directions electric brake force distribution— In the automobile dual-directions braking system comprising the dual-directions braking mechanism of the present invention, an automobile electronic safety brake control function for avoiding running astray, due to front steering wheels out of control, and drifting, due to rear wheels skidding, which are caused by an uneven distribution of dual-directions braking force between left wheels and right wheels when braking, is defined as a dual-directions electric brake force distribution. The English expression Dual-directions Electric Brake force Distribution is abbreviated as DEBD.

DESP dual-directions electronic stability program— In the automobile dual-directions braking system comprising the dual-directions braking mechanism of the present invention, an automobile active safety electronic control function, for actively monitoring and controlling driving safety and stability, and avoiding an oversteer or an understeer of the front wheels, running astray, skidding of the rear wheels and drifting, is defined as a dual-directions electronic stability program. The English expression Dual-directions Electronic Stability Program is abbreviated as DESP.

What is claimed is:

1. A braking mechanism of a disc brake, comprising brake calipers, and further comprising:
   a crankshaft which comprises three concentric sections and two eccentric sections, two friction discs, a friction disc ring, a wheel mounting flange, at least a pair of brake calipers and corresponding caliper mounting frames, wherein:
   the two eccentric sections are mutually disposed at 180°, and provided between each neighboring two of the three concentric sections; two of the three concentric sections are provided at two ends of the crankshaft, and the rest one of the three concentric sections is provided between the two eccentric sections; the two friction discs are respectively provided on the two eccentric sections; the friction disc ring, provided on the concentric section between the two eccentric sections, is clamped between the two friction discs, so that two surfaces of the two friction discs obtain identical capabilities for bearing an operation pressure along axial directions of the two eccentric sections while obtaining operation abilities with bidirectional braking moments in a rotation direction of the three concentric sections; the two concentric sections at the two ends of the crankshaft are respectively adapted to mount the wheel mounting flange and for a rotary connection to bearings of a wheel shaft; the pair of brake calipers comprises a friction pad pair whose operation surfaces are opposite to each other, and at least a hydraulic wheel cylinder for supplying the friction pad pair with opposite operation pressures to ensure that the operation surfaces of the friction pad pair are both able to contact and rub with the two surfaces of the two friction discs when the friction pad pair is at work; all of the caliper mounting frames are fixedly connected to or integrated with a static sleeve of the wheel shaft; each pair of brake calipers is mounted on the corresponding caliper mounting frame, in such a manner that the hydraulic wheel cylinder and the friction pad pair are able to simultaneously provide the operation surfaces between the two friction discs and the friction disc ring with the axial operation pressure;

when the braking mechanism is idle, no contact and no friction exists between the two friction discs and the operation surface of the friction pad pair of each pair of brake calipers; the two friction discs and the friction disc ring synchronously revolve with the crankshaft around an axis of the three concentric sections merely through the mutual rotating static friction, and have no braking moment on the concentric sections;

when the braking mechanism starts to operate, in accordance to an instant rotation velocity of the three concentric sections of the crankshaft, firstly the hydraulic wheel cylinder of each pair of brake calipers synchronously generates a "rising slope wave pressure", and drives the friction pad pair to move towards each other so that the operation surfaces of the friction pad pair of the pair of brake calipers contact with the two friction discs at the same time and generate the axial operation pressure; under the axial operation pressure, the two friction discs start to revolve synchronously around the axis of the three concentric sections in a revolving direction, and meanwhile rotate respectively around two axes of the two eccentric sections of the crankshaft in a direction opposite to the revolving direction; in the meantime, the friction disc ring rotates around the axis of the three concentric sections in the direction opposite to the revolving direction; therefore, between the two friction discs and the operation surfaces of the friction pad pair of each pair of brake calipers, and between the two friction discs and the operation surfaces of the friction disc ring, a translationally rotating friction instant impulse process, which is inherent when the braking mechanism starts to operate, is formed synchronously;

when the two friction discs finish the translationally rotating friction instant impulse process and readily enter a translationally rotating friction stable operation process, the hydraulic wheel cylinder readily stops generating the "rising slope wave pressure", and readily generates an operation pressure of an arbitrary waveform which is exerted onto the friction pad pair of each pair of brake calipers, the two friction discs and the friction disc ring, so as to ensure the translationally rotating friction stable operation of the two friction discs; accordingly, a backward braking moment in a direction opposite to the rotation direction of the concentric sections of the crankshaft and a forward braking moment in a direction identical to the rotation direction thereof are generated simultaneously and respectively by the concentric sections of the crankshaft; and when the braking mechanism finishes operating, in accordance to the instant rotation velocity of the three concentric sections of the crankshaft, the hydraulic wheel cylinder of each pair of brake calipers synchronously generates a "falling slope wave pressure" with a variable slope, so as to rapidly finish a translationally rotating friction instant impulse process, which is inherent when the braking mechanism finishes operating, among the friction pad pair, the two friction discs and the friction disc ring; then, the friction pad pair of each pair of brake calipers is synchronously separated from the operation surfaces of the two friction discs; the two friction discs and the friction disc ring simultaneously stop rotating in the direction opposite to the revolving direction around the crankshaft and actively returns to the non-operational recovery state.

2. The braking mechanism, as recited in claim 1, further comprising rolling bearings, connected between the two friction discs and the corresponding eccentric sections of the crankshaft, and between the friction disc ring and the corresponding concentric section of the crankshaft, for reducing rotating friction between the two friction discs and the corresponding eccentric sections of the crankshaft, and between the friction disc ring and the corresponding concentric section of the crankshaft, so as to facilitate simultaneously generating the dual-directions braking moments on the concentric sections through the translationally rotating friction between the two frictions discs and the friction disc ring and through the moments on the two eccentric sections.

3. An automobile dual-directions braking system of the braking mechanism as recited in claim 1, comprising:

four of the dual-directions braking mechanisms as recited in claim 1 which are respectively provided within four wheel hubs, four wheel speed sensors which are respectively provided for four wheels; an electronic control unit comprising a microprocessor, a steering angle sensor, a yaw-rate sensor, a lateral acceleration sensor and a mechanical electronic brake pedal; a brake hydraulic device which is controlled by the electronic control unit to generate "slope wave pressure" with variable rising and falling pressure slopes, for supplying the hydraulic wheel cylinder of each pair of brake calipers on each braking mechanism with operation pressure, wherein the brake hydraulic device comprises hydraulic adjustment elements comprising a plurality of pressure-limiting valves and proportional valves based on a brake hydraulic controller technology of conventionally advanced and mature ESP; a plurality of electronic detection input interfaces, provided in the electronic control unit, respectively and correspondingly provided for each wheel speed sensor, the steering angle sensor, the yaw-rate sensor, the lateral acceleration sensor and the mechanical electronic brake pedal; a plurality of electronic control output interfaces correspondingly provided for the brake hydraulic device; and a standard communication bus interface, for satisfying requirements of various real-time input detection, output and communication control of the automobile dual-directions braking system; wherein when the dual-directions braking system operates at an automobile driving state, firstly the electronic control unit detects out an operation voltage signal of the mechanical electronic brake pedal through the electronic detection input interface; based on the instant wheel speed detected in real time by each of the wheel speed sensors and the corresponding electronic detection input interfaces, the electronic control unit actively controls the brake hydraulic device to synchronously generate the "rising slope wave pressure" for the hydraulic wheel cylinder on each dual-directions braking mechanism, so as to induce and control a response time and an impulse intensity of the translationally rotating friction instant impulse process when the dual-directions braking mechanism starts to operate, so that each dual-directions braking mechanism is able to synchronously and rapidly enter the translationally rotating friction stable operation process; once each of the four dual-directions braking mechanism synchronously finishes the translationally rotating friction instant impulse process and enters the translationally rotating friction stable operation process, through the electronic control output interfaces, the electronic control unit actively adjusts the pressure-limiting valve and the proportional valve in the brake hydraulic device, and readily stops inducing by the "rising slope wave pressure"; in the meantime, the brake hydraulic device is controlled by the electronic control unit to readily and synchronously generate the operation pressures of arbitrary waveforms for each dual-directions braking mechanism, wherein the operation pressures change in real time with an operation stroke of the mechanical electronic brake pedal, so as to increase, decrease or maintain the operation pressures for each dual-directions braking mechanism; accordingly, each dual-directions braking mechanism generates the corresponding backward and forward braking moments and the dual-directions braking effect during the translationally rotating friction stable operation process, until the operation voltage signal of the mechanical electronic brake pedal is canceled; when the electronic control unit detects via the electronic detection input interfaces that the operation voltage signal of the mechanical electronic brake pedal is canceled, the electronic control unit controls the brake hydraulic device through the electronic output control interfaces based on the instant wheel speed detected in real time by each of the wheel speed sensors and the corresponding electronic detection input interfaces; the brake hydraulic device is controlled by the electronic control unit to generate the "falling slope wave pressure" whose slope is proportional to the instant wheel speed, in such a manner that each dual-directions braking mechanism rapidly finishes the translationally rotating friction instant impulse process, which is inherent when the braking mechanism finishes operating, and synchronously and actively returns to the non-operational recovery state;

when each dual-directions braking mechanism in the dual-directions braking system is in the synchronous translationally rotating friction stable operation process, based on a series of real-time active detection, computing, judgment and control which comprises the real-time detection by each wheel speed sensor on the wheels, the real-time computing and judgment about each tire slip rate on a road surface, and the dual-directions braking moments on each dual-directions braking mechanism, the electronic control unit controls a dual-directions anti-lock braking system (DABS) and a dual-directions electric brake force distribution (DEBD) of each wheel, so as to avoid a sliding friction in an emergency braking due to surpassing a maximal friction adhesive force of each tire on the road surface and an uneven distribution of dual-directions braking force on each tire; otherwise, the automobile would encounter steering failure, run astray or drift; the dual-directions braking system improves safety and reliability of the automobile; and when the dual-directions braking system operates at the automobile driving state, if the electronic control unit actively detects out an oversteer or an understeer of front wheels, via the real-time detections by the wheel speed sensors, the steering angle sensor, the yaw-rate sensor, the lateral acceleration sensor and the corresponding electronic detection input interfaces, and real-time high-speed computing and analysis about driving stability of the automobile, upon a precursor of unstable driving, the electronic control unit actively controls the operation pressures from the brake hydraulic device required for the translationally rotating friction instant impulse process, which is inherent when each dual-direction braking mechanism starts to operate, and for the translationally rotating friction stable operation process, takes advantage of the dual-directions braking performance in a wide dynamic range of each dual-directions braking mechanism on a basis of an active control of the DABS and the DEBD, and combines the real-time active control method for the dual-directions braking moments by each dual-directions braking mechanism with a wheel driving torque control method of a traction control system (TCS) or an acceleration slip regulation (ASR) system which is accomplished by real-time communications with a conventional automobile engine management system via the standard communication bus interface, so as to readily rectify driving attitudes in real time, such as the steering failure, the running astray and the drifting; and therefore, the dual-directions electronic stability program (DESP) has a function of the active safety control, so as to further improve the safety and stability of the automobile driving.

4. The braking mechanism, as recited in claim 1, wherein two pairs of brake calipers are provided in a horizontal symmetry; all the operation surfaces of the friction pad pairs of the two pairs of brake calipers are able to contact and rub with the operation surfaces of the two friction discs when the friction pad pairs are at work.

* * * * *